US012747675B2

(12) United States Patent
McCune et al.

(10) Patent No.: US 12,747,675 B2
(45) **Date of Patent: *Sep. 29, 2026**

(54) FLEXIBLE SUPPORT STRUCTURE FOR A GEARED ARCHITECTURE GAS TURBINE ENGINE

(71) Applicant: Raytheon Technologies Corporation, Farmington, CT (US)

(72) Inventors: Michael E. McCune, Colchester, CT (US); Jason Husband, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 701 days.

This patent is subject to a terminal disclaimer.

(21) Appl. No.: 17/394,497

(22) Filed: Aug. 5, 2021

(65) Prior Publication Data

US 2021/0363898 A1 Nov. 25, 2021

Related U.S. Application Data

(63) Continuation of application No. 16/667,154, filed on Oct. 29, 2019, now Pat. No. 11,111,818, which is a (Continued)

(51) Int. Cl.

*F01D 25/16* (2006.01)
*F01D 5/06* (2006.01)

(Continued)

(52) U.S. Cl.

CPC ............. *F01D 25/164* (2013.01); *F01D 5/06* (2013.01); *F01D 9/02* (2013.01); *F01D 15/12* (2013.01);

(Continued)

(58) Field of Classification Search

None

See application file for complete search history.

(56) References Cited

U.S. PATENT DOCUMENTS 791,754 A 6/1905 Danzenbaker
1,090,416 A 3/1914 Roth (Continued)

FOREIGN PATENT DOCUMENTS

CA 2789325 A1 4/2013
CA 2789465 A1 4/2013

(Continued)

OTHER PUBLICATIONS

Notice of Opposition for European Patent No. 2949882 (15175205.2) dated May 22, 2018 by Rolls-Royce, 18 pages.

(Continued)

*Primary Examiner* — Juan G Flores

(74) *Attorney, Agent, or Firm* — Carlson, Gaskey & Olds, P.C.

(57) ABSTRACT

A gas turbine engine includes a fan section that has fan blades that drive air along a bypass flow path in a bypass duct. A fan shaft is drivingly connected to the fan. A turbine section includes a turbine drive shaft. A gear system is connected to the turbine draft shaft through an input and connected to the fan shaft through an output. At least one of the input and the output include a flexible coupling. A gear system flex mount arrangement accommodates misalignment of the fan shaft and the turbine drive shaft during operation. The gear system flex mount arrangement includes a gear mesh that defines a gear mesh lateral stiffness and a ring gear that defines a ring gear lateral stiffness that is less than 12% of the gear mesh lateral stiffness.

30 Claims, 9 Drawing Sheets

Related U.S. Application Data continuation of application No. 16/125,179, filed on Sep. 7, 2018, now Pat. No. 10,590,802, which is a continuation of application No. 15/606,494, filed on May 26, 2017, now Pat. No. 10,227,893, which is a continuation of application No. 14/859,381, filed on Sep. 21, 2015, now Pat. No. 10,301,968, which is a continuation of application No. 14/604,811, filed on Jan. 26, 2015, now Pat. No. 9,239,012, which is a continuation-in-part of application No. 13/623,309, filed on Sep. 20, 2012, now Pat. No. 9,133,729, which is a continuation-in-part of application No. 13/342, 508, filed on Jan. 3, 2012, now Pat. No. 8,297,916.

(60) Provisional application No. 61/494,453, filed on Jun. 8, 2011.

(51) Int. Cl.

| | |
|---|---|
| ***F01D 9/02*** | (2006.01) |
| ***F01D 15/12*** | (2006.01) |
| ***F01D 25/28*** | (2006.01) |
| ***F02C 7/32*** | (2006.01) |
| ***F02C 7/36*** | (2006.01) |
| ***F02K 3/06*** | (2006.01) |
| ***F04D 19/02*** | (2006.01) |
| ***F04D 25/04*** | (2006.01) |
| ***F04D 29/053*** | (2006.01) |
| ***F04D 29/056*** | (2006.01) |
| ***F04D 29/32*** | (2006.01) |

(52) U.S. Cl.

CPC ............ *F01D 25/16* (2013.01); *F01D 25/28* (2013.01); *F02C 7/32* (2013.01); *F02C 7/36* (2013.01); *F02K 3/06* (2013.01); *F04D 19/02* (2013.01); *F04D 25/045* (2013.01); *F04D 29/053* (2013.01); *F04D 29/056* (2013.01); *F04D 29/321* (2013.01); *F04D 29/325* (2013.01); *F05D 2220/32* (2013.01); *F05D 2240/60* (2013.01); *F05D 2260/40311* (2013.01); *F05D 2260/96* (2013.01); *Y02T 50/60* (2013.01); *Y10T 29/49321* (2015.01)

(56) References Cited

U.S. PATENT DOCUMENTS

| | | | |
|---|---|---|---|
| 2,258,792 | A | 10/1941 | New |
| 2,608,821 | A | 9/1952 | Hunsaker |
| 2,748,623 | A | 6/1956 | Hill |
| 2,936,655 | A | 5/1960 | Peterson et al. |
| 3,021,731 | A | 2/1962 | Stoeckicht |
| 3,033,002 | A | 5/1962 | William et al. |
| 3,111,005 | A | 11/1963 | Howell et al. |
| 3,172,717 | A | 3/1965 | Brasher et al. |
| 3,185,857 | A | 5/1965 | Johnson |
| 3,194,487 | A | 7/1965 | Tyler et al. |
| 3,250,512 | A | 5/1966 | Alexander et al. |
| 3,287,906 | A | 11/1966 | Mccormick |
| 3,352,178 | A | 11/1967 | Lindgren et al. |
| 3,412,560 | A | 11/1968 | Gaubatz |
| 3,526,092 | A | 9/1970 | Steel et al. |
| 3,527,054 | A | 9/1970 | Hemsworth et al. |
| 3,664,612 | A | 5/1972 | Skidmore et al. |
| 3,729,957 | A | 5/1973 | Petrie et al. |
| 3,747,343 | A | 7/1973 | Rosen |
| 3,754,484 | A | 8/1973 | Roberts |
| 3,765,623 | A | 10/1973 | Donelson et al. |
| 3,820,719 | A | 6/1974 | Clark et al. |
| 3,843,277 | A | 10/1974 | Ehrich |
| 3,861,139 | A | 1/1975 | Jones |
| 3,892,358 | A | 7/1975 | Gisslen |
| 3,932,058 | A | 1/1976 | Harner et al. |
| 3,935,558 | A | 1/1976 | Miller et al. |
| 3,988,889 | A | 11/1976 | Chamay et al. |
| 4,084,861 | A | 4/1978 | Greenberg et al. |
| 4,090,416 | A | 5/1978 | Hicks |
| 4,130,872 | A | 12/1978 | Haloff |
| 4,136,286 | A | 1/1979 | O'Halloran et al. |
| 4,201,513 | A | 5/1980 | Sales |
| 4,220,171 | A | 9/1980 | Ruehr et al. |
| 4,221,114 | A | 9/1980 | Wilde et al. |
| 4,233,555 | A | 11/1980 | Roche |
| 4,240,250 | A | 12/1980 | Harris |
| 4,275,557 | A | 6/1981 | Marvin et al. |
| 4,284,174 | A | 8/1981 | Salvana et al. |
| 4,289,360 | A | 9/1981 | Zirin |
| 4,304,522 | A | 12/1981 | Newland |
| 4,405,892 | A | 9/1983 | Staerzl |
| 4,463,553 | A | 8/1984 | Boudigues |
| 4,478,551 | A | 10/1984 | Honeycutt, Jr. et al. |
| 4,649,114 | A | 3/1987 | Miltenburger et al. |
| 4,660,376 | A | 4/1987 | Johnson |
| 4,693,616 | A | 9/1987 | Rohra et al. |
| 4,696,156 | A | 9/1987 | Burr et al. |
| 4,722,357 | A | 2/1988 | Wynosky |
| 4,808,076 | A | 2/1989 | Jarmon et al. |
| 4,809,498 | A | 3/1989 | Giffin, III et al. |
| 4,825,644 | A | 5/1989 | Bubello et al. |
| 4,825,723 | A | 5/1989 | Martin |
| 4,827,712 | A | 5/1989 | Coplin |
| 4,879,624 | A | 11/1989 | Jones et al. |
| 4,885,912 | A | 12/1989 | Nakhamkin |
| 4,916,894 | A | 4/1990 | Adamson et al. |
| 4,979,362 | A | 12/1990 | Vershure, Jr. |
| 5,058,617 | A | 10/1991 | Stockman et al. |
| 5,074,109 | A | 12/1991 | Mandet et al. |
| 5,081,832 | A | 1/1992 | Mowill |
| 5,102,379 | A | 4/1992 | Pagluica et al. |
| 5,141,400 | A | 8/1992 | Murphy et al. |
| 5,160,251 | A | 11/1992 | Ciokajlo |
| 5,168,208 | A | 12/1992 | Schultz et al. |
| 5,182,464 | A | 1/1993 | Woodworth et al. |
| 5,252,905 | A | 10/1993 | Wills et al. |
| 5,307,622 | A | 5/1994 | Ciokajlo et al. |
| 5,317,877 | A | 6/1994 | Stuart |
| 5,361,580 | A | 11/1994 | Ciokajlo et al. |
| 5,388,964 | A | 2/1995 | Ciokajlo et al. |
| 5,390,068 | A | 2/1995 | Schultz et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,486,533 | A | 1/1996 | Mishra et al. |
| 5,486,553 | A | 1/1996 | Deaner et al. |
| 5,524,847 | A | 6/1996 | Brodell et al. |
| 5,539,027 | A | 7/1996 | Deaner et al. |
| 5,607,165 | A | 3/1997 | Bredemeyer |
| 5,625,276 | A | 4/1997 | Scott et al. |
| 5,634,767 | A | 6/1997 | Dawson |
| 5,677,060 | A | 10/1997 | Terentieva et al. |
| 5,694,027 | A | 12/1997 | Satake et al. |
| 5,729,059 | A | 3/1998 | Kilroy et al. |
| 5,734,255 | A | 3/1998 | Thompson et al. |
| 5,740,668 | A | 4/1998 | Fujiwara et al. |
| 5,754,033 | A | 5/1998 | Thomson |
| 5,778,659 | A | 7/1998 | Duesler et al. |
| 5,806,303 | A | 9/1998 | Johnson |
| 5,857,836 | A | 1/1999 | Stickler et al. |
| 5,886,890 | A | 3/1999 | Ishida et al. |
| 5,915,917 | A | 6/1999 | Eveker et al. |
| 5,949,153 | A | 9/1999 | Tison et al. |
| 5,975,841 | A | 11/1999 | Lindemuth et al. |
| 5,985,470 | A | 11/1999 | Spitsberg et al. |
| 6,073,439 | A | 6/2000 | Beaven et al. |
| 6,104,171 | A | 8/2000 | Dvorsky et al. |
| 6,172,717 | B1 | 1/2001 | Ebihara |
| 6,205,432 | B1 | 3/2001 | Gabbard et al. |
| 6,209,311 | B1 | 4/2001 | Itoh et al. |
| 6,223,616 | B1 | 5/2001 | Sheridan |
| 6,260,351 | B1 | 7/2001 | Delano et al. |
| 6,307,622 | B1 | 10/2001 | Lewis |

(56) References Cited

U.S. PATENT DOCUMENTS 6,315,815 B1 11/2001 Spadaccini et al.
6,318,070 B1 11/2001 Rey et al.
6,339,927 B1 1/2002 DiPietro, Jr.
6,378,308 B1 4/2002 Pfluger
6,387,456 B1 5/2002 Eaton, Jr. et al.
6,517,341 B1 2/2003 Brun et al.
6,555,929 B1 4/2003 Eaton et al.
6,607,165 B1 8/2003 Manteiga et al.
6,619,030 B1 9/2003 Seda et al.
6,631,310 B1 10/2003 Leslie
6,639,331 B2 10/2003 Schultz
6,647,707 B2 11/2003 Dev
6,653,821 B2 11/2003 Kern et al.
6,657,416 B2 12/2003 Kern et al.
6,663,530 B2 12/2003 Poulin et al.
6,668,629 B1 12/2003 Leslie
6,669,393 B2 12/2003 Schilling
6,708,482 B2 3/2004 Seda
6,709,492 B1 3/2004 Spadaccini et al.
6,732,502 B2 5/2004 Seda et al.
6,735,954 B2 5/2004 Macfarlane et al.
6,763,653 B2 7/2004 Orlando et al.
6,792,759 B2 9/2004 Rollins, III
6,814,541 B2 11/2004 Evans et al.
6,847,297 B2 1/2005 Lavoie et al.
6,855,089 B2 2/2005 Poulin et al.
6,883,303 B1 4/2005 Seda
6,892,115 B2 5/2005 Berkcan et al.
6,895,741 B2 5/2005 Rago et al.
6,909,942 B2 6/2005 Andarawis et al.
6,914,763 B2 7/2005 Reedy
6,966,174 B2 11/2005 Paul
6,985,784 B2 1/2006 Vandevanter et al.
6,999,291 B2 2/2006 Andarawis et al.
7,019,495 B2 3/2006 Patterson
7,021,042 B2 4/2006 Law
7,043,340 B2 5/2006 Papallo et al.
7,055,306 B2 6/2006 Jones et al.
7,104,918 B2 9/2006 Mitrovic
7,144,349 B2 12/2006 Mitrovic
7,195,446 B2 3/2007 Seda et al.
7,216,475 B2 5/2007 Johnson
7,219,490 B2 5/2007 Dev
7,223,197 B2 5/2007 Poulin et al.
7,269,938 B2 9/2007 Moniz et al.
7,299,621 B2 11/2007 Bart et al.
7,301,738 B2 11/2007 Pearlman et al.
7,328,580 B2 2/2008 Lee et al.
7,334,392 B2 2/2008 Moniz et al.
7,338,259 B2 3/2008 Shah et al.
7,374,403 B2 5/2008 Decker et al.
7,393,182 B2 7/2008 Matheny
7,406,830 B2 8/2008 Valentian et al.
7,409,819 B2 8/2008 Henry
7,451,592 B2 11/2008 Taylor et al.
7,513,103 B2 4/2009 Orlando et al.
7,557,544 B2 7/2009 Heinz et al.
7,591,754 B2 9/2009 Duong et al.
7,594,404 B2 9/2009 Somanath et al.
7,600,370 B2 10/2009 Dawson
7,610,763 B2 11/2009 Somanath et al.
7,631,484 B2 12/2009 Giffin et al.
7,632,064 B2 12/2009 Somanath et al.
7,656,060 B2 2/2010 Algrain
7,662,059 B2 2/2010 McCune
7,665,293 B2 2/2010 Wilson, Jr. et al.
7,685,808 B2 3/2010 Orlando et al.
7,694,505 B2 4/2010 Schilling
7,704,178 B2 4/2010 Sheridan et al.
7,716,914 B2 5/2010 Schilling
7,721,549 B2 5/2010 Baran
7,762,086 B2 7/2010 Schwark
7,765,786 B2 8/2010 Klingels et al.
7,797,946 B2 9/2010 Kumar et al.
7,806,651 B2 10/2010 Kennepohl et al.
7,815,417 B2 10/2010 Somanath et al.
7,816,813 B2 10/2010 Yagudayev et al.
7,824,305 B2 11/2010 Duong et al.
7,828,682 B2 11/2010 Smook
7,832,193 B2 11/2010 Orlando et al.
7,841,163 B2 11/2010 Welch et al.
7,841,165 B2 11/2010 Orlando et al.
7,871,247 B2 1/2011 Shah et al.
7,882,693 B2 2/2011 Schilling
7,926,260 B2 4/2011 Sheridan et al.
7,959,532 B2 6/2011 Suciu et al.
7,997,868 B1 8/2011 Liang
8,001,763 B2 8/2011 Grabowski et al.
8,015,798 B2 9/2011 Norris et al.
8,015,828 B2 9/2011 Moniz et al.
8,061,969 B2 11/2011 Durocher et al.
8,075,261 B2 12/2011 Merry et al.
8,091,371 B2 1/2012 Durocher et al.
8,104,265 B2 1/2012 Kupratis
8,106,633 B2 1/2012 Dozier et al.
8,166,748 B2 5/2012 Schilling
8,172,717 B2 5/2012 Lopez et al.
8,191,352 B2 6/2012 Schilling
8,205,432 B2 6/2012 Sheridan
8,297,916 B1 10/2012 McCune et al.
8,561,383 B2 10/2013 Suciu et al.
8,640,336 B2 2/2014 Sheridan et al.
8,770,922 B2 7/2014 McCune et al.
9,133,729 B1 9/2015 McCune et al.
9,239,012 B2 * 1/2016 McCune .................. F02C 7/36
9,297,917 B2 3/2016 Mah et al.
9,523,422 B2 12/2016 McCune et al.
9,631,558 B2 4/2017 McCune et al.
9,752,511 B2 9/2017 McCune et al.
10,107,378 B2 * 10/2018 Miller ...................... F02K 3/06
10,227,893 B2 * 3/2019 McCune .................. F02K 3/06
10,301,968 B2 * 5/2019 McCune .................. F02K 3/06
10,590,802 B2 * 3/2020 McCune ............... F01D 25/164
11,021,996 B2 * 6/2021 McCune ................. F04D 19/02
11,021,997 B2 * 6/2021 McCune .................. F01D 5/06
11,022,044 B1 * 6/2021 Spruce ...................... F02K 3/06
11,698,007 B2 * 7/2023 McCune .................. F02C 7/32
415/122.1
2003/0163984 A1 9/2003 Seda et al.
2003/0235523 A1 12/2003 Lyubovsky et al.
2005/0138914 A1 6/2005 Paul
2006/0029894 A1 2/2006 Zinn et al.
2006/0130456 A1 6/2006 Suciu et al.
2006/0177302 A1 8/2006 Berry
2006/0179818 A1 8/2006 Merchant
2006/0228206 A1 10/2006 Decker et al.
2006/0244327 A1 11/2006 Kundel
2007/0125066 A1 6/2007 Orlando et al.
2007/0214795 A1 9/2007 Cooker et al.
2007/0225111 A1 9/2007 Duong et al.
2007/0262661 A1 11/2007 Ai
2007/0265133 A1 11/2007 Smook
2008/0003096 A1 1/2008 Kohli et al.
2008/0044276 A1 2/2008 McCune et al.
2008/0056888 A1 3/2008 Somanath et al.
2008/0097813 A1 4/2008 Collins et al.
2008/0098713 A1 5/2008 Orlando et al.
2008/0098714 A1 5/2008 Orlando et al.
2008/0098718 A1 5/2008 Henry et al.
2008/0116009 A1 5/2008 Sheridan et al.
2008/0148881 A1 6/2008 Moniz et al.
2008/0149445 A1 6/2008 Kern et al.
2008/0184694 A1 8/2008 Guimbard et al.
2008/0276621 A1 11/2008 Somanath et al.
2008/0304974 A1 12/2008 Marshall et al.
2008/0317588 A1 12/2008 Grabowski et al.
2009/0053058 A1 2/2009 Kohlenberg et al.
2009/0056306 A1 3/2009 Suciu et al.
2009/0056343 A1 3/2009 Suciu et al.
2009/0074565 A1 3/2009 Suciu et al.
2009/0090096 A1 4/2009 Sheridan
2009/0097967 A1 4/2009 Smith et al.
2009/0145102 A1 6/2009 Roberge et al.
2009/0151317 A1 6/2009 Norris et al.

(56) References Cited

U.S. PATENT DOCUMENTS

| | | | |
|---|---|---|---|
| 2009/0183512 A1 | 7/2009 | Suciu et al. | |
| 2009/0229242 A1 | 9/2009 | Schwark | |
| 2009/0293445 A1 | 12/2009 | Ress, Jr. | |
| 2009/0304518 A1 | 12/2009 | Kodama et al. | |
| 2009/0314881 A1 | 12/2009 | Suciu et al. | |
| 2009/0317229 A1 | 12/2009 | Suciu et al. | |
| 2009/0320488 A1 | 12/2009 | Gilson et al. | |
| 2010/0005810 A1 | 1/2010 | Jarrell et al. | |
| 2010/0007207 A1 | 1/2010 | Peuser | |
| 2010/0080700 A1 | 4/2010 | Venter | |
| 2010/0105516 A1 | 4/2010 | Sheridan et al. | |
| 2010/0126141 A1 | 5/2010 | Schilling | |
| 2010/0132376 A1 | 6/2010 | Durocher et al. | |
| 2010/0132377 A1 | 6/2010 | Durocher et al. | |
| 2010/0135786 A1 | 6/2010 | Manteiga et al. | |
| 2010/0148396 A1 | 6/2010 | Xie et al. | |
| 2010/0154384 A1 | 6/2010 | Schilling | |
| 2010/0212281 A1 | 8/2010 | Sheridan | |
| 2010/0218483 A1 | 9/2010 | Smith | |
| 2010/0219779 A1 | 9/2010 | Bradbrook | |
| 2010/0301617 A1 | 12/2010 | Lundbladh | |
| 2010/0326050 A1 | 12/2010 | Schilling et al. | |
| 2010/0331139 A1 | 12/2010 | McCune | |
| 2011/0056208 A1 | 3/2011 | Norris et al. | |
| 2011/0081237 A1 | 4/2011 | Durocher et al. | |
| 2011/0106510 A1 | 5/2011 | Poon | |
| 2011/0116510 A1 | 5/2011 | Breslin et al. | |
| 2011/0130246 A1* | 6/2011 | McCune | F16H 1/48<br>29/700 |
| 2011/0149624 A1 | 6/2011 | Yamanaka | |
| 2011/0159797 A1 | 6/2011 | Beltman et al. | |
| 2011/0165983 A1 | 7/2011 | Fox | |
| 2011/0208400 A1 | 8/2011 | Lickfold et al. | |
| 2011/0286836 A1 | 11/2011 | Davis | |
| 2011/0293423 A1 | 12/2011 | Bunker et al. | |
| 2012/0007431 A1 | 1/2012 | Jang et al. | |
| 2012/0017603 A1 | 1/2012 | Bart et al. | |
| 2012/0124964 A1 | 5/2012 | Hasel et al. | |
| 2012/0263578 A1 | 10/2012 | Davis et al. | |
| 2012/0291449 A1 | 11/2012 | Adams et al. | |
| 2013/0011547 A1 | 1/2013 | Girard et al. | |
| 2013/0115476 A1 | 5/2013 | Castle et al. | |
| 2013/0192196 A1 | 8/2013 | Suciu et al. | |
| 2013/0192266 A1 | 8/2013 | Houston et al. | |
| 2013/0219913 A1 | 8/2013 | McCune et al. | |
| 2013/0224003 A1 | 8/2013 | Kupratis et al. | |
| 2013/0259650 A1 | 10/2013 | Schwarz et al. | |
| 2013/0259653 A1 | 10/2013 | Schwarz et al. | |
| 2013/0287575 A1 | 10/2013 | McCune et al. | |
| 2013/0310213 A1 | 11/2013 | Matsuoka et al. | |
| 2013/0331223 A1 | 12/2013 | McCune et al. | |
| 2013/0331224 A1 | 12/2013 | McCune et al. | |
| 2014/0020404 A1 | 1/2014 | Sheridan et al. | |
| 2014/0133958 A1 | 5/2014 | McCune et al. | |
| 2014/0140819 A1 | 5/2014 | McCune et al. | |
| 2014/0174056 A1 | 6/2014 | Suciu et al. | |
| 2016/0032826 A1 | 2/2016 | Rued et al. | |
| 2017/0122426 A1* | 5/2017 | Miller | F16H 57/0006 |
| 2017/0335718 A1 | 11/2017 | McCune et al. | |
| 2021/0172378 A1* | 6/2021 | Spruce | F02K 3/06 |

FOREIGN PATENT DOCUMENTS

| | | | |
|---|---|---|---|
| EP | 0253548 | A2 | 1/1988 |
| EP | 0791383 | A1 | 8/1997 |
| EP | 1142850 | A1 | 10/2001 |
| EP | 1703085 | A2 | 9/2006 |
| EP | 2071139 | A2 | 6/2009 |
| EP | 2270361 | A2 | 1/2011 |
| EP | 2532841 | A2 | 12/2012 |
| EP | 2532858 | A2 | 12/2012 |
| EP | 2551488 | A2 | 1/2013 |
| EP | 2551489 | A2 | 1/2013 |
| EP | 2737180 | A1 | 6/2014 |
| EP | 2809931 | A1 | 12/2014 |
| EP | 2949881 | A1 | 12/2015 |
| EP | 2532841 | B1 | 4/2016 |
| EP | 2809931 | B1 | 7/2016 |
| FR | 2912181 | A1 | 8/2008 |
| GB | 1516041 | A | 6/1978 |
| GB | 2041090 | A | 9/1980 |
| GB | 2419639 | A | 5/2006 |
| GB | 2426792 | A | 12/2006 |
| GB | 2419639 | B | 9/2009 |
| WO | 2007038674 | A1 | 4/2007 |
| WO | 2010030724 | A1 | 3/2010 |
| WO | 2013116262 | A1 | 8/2013 |
| WO | 2013154636 | A1 | 10/2013 |
| WO | 2014047040 | A1 | 3/2014 |
| WO | 2015156885 | A2 | 10/2015 |

OTHER PUBLICATIONS

Notice of Opposition for European Patent No. EP3051078 dated Jul. 31, 2018, 45 pages.

Notice of Opposition from Rolls Royce for Application No. 16159312.4 (Patent No. EP3045684) dated Dec. 14, 2020. 23 pgs.

Notice of Opposition from Rolls Royce for Application No. 16174051.9 (Patent No. EP3098396) dated Dec. 14, 2020. 24 pgs.

Notice of Opposition of European Patent Application No. EP13786893.1 (European Patent No. 2809939) by Safran Aircraft Engines dated Sep. 24, 2018.

Notice of Opposition of European Patent No. 2811120 (14155460.0), mailed Apr. 12, 2018 by Rolls-Royce, 74 pages.

Notice of Opposition of European Patent No. EP2834469 by Safran Aircraft Engines dated Mar. 27, 2019. [with English translation].

Notice of Opposition of European Patent No. EP2949881, by Rolls-Royce dated May 28, 2019, 19 pages.

Notice of Opposition of European Patent No. EP2949881, by Safran Aircraft Engines, dated May 28, 2019, 87 pages.

Notice of Opposition submitted for EP Application No. 15175203.7 (Patent No. EP2949881) by Rolls Royce dated May 28, 2019.

Notice of Opposition to European Patent No. EP2809931 (EP13743042.7), United Technologies Corporation opposed by Safran Aircraft Engines dated Apr. 20, 2017. [with English translation].

Notice of Opposition to Patent No. EP2811120 (14155460.0) by Safran Aircraft Engines dated Apr. 12, 2018. [with English translation].

Dates, G.C. (Ed). (1989). Aircraft propulsion systems and technology and design. Washington, D.C.: American Institute of Aeronautics, Inc. pp. 341-344.

Opinion Under Section 74(a) by for European Patent Application No. 2809922, mailed May 9, 2019.

Opposition—further submission filed for European Patent No. EP2949882, (EP Application No. 15175205.2) by Safran on Mar. 12, 2019. [with English translation].

Opposition Response Safran for European Patent No 2949882 (EP Application No. 15175205.2), dated Mar. 20, 2019, 78 pages.

Parametric study of STOL short-haul transport engine cycles and operational techniques to minimize community noise Impact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Patent Owner's Preliminary Response in U.S. Pat. No. 8,899,915, *General Electric Company*, Petitioner, v. *United Technologies Corp.*, Patent Owner. IPR2017-00522, Entered Apr. 19, 2017. pp. 1-54.

Peters A., et al., "Ultrashort Nacelles for Low Fan Pressure Ratio Propulsors", Journal of Turbomachinery, vol. 137 (2), Sep. 10, 2014, 16 pages.

Petition for Inter Partes Review of U.S. Pat. No. 8,297,916, *General Electric Company*, Petitioner, v. *United Technologies Corporation*, Patent Owner, IPR2018-01171, May 30, 2018.

Petition for Inter Partes Review of U.S. Pat. No. 8,297,916, *General Electric Company*, Petitioner, v, *United Technologies Corporation*, Patent Owner: IPR2018-01172, filed May 30, 2018, 83 pages.

(56) References Cited

OTHER PUBLICATIONS

Petition for Inter Partes Review of U.S. Pat. No. 8,899,915. *General Electric Company*, Petitioner, v. *United Technologies Corporation*, Patent Owner. IPR2017-00522. Dec. 21, 2016, 72 pages.
Petition for Inter Partes Review of U.S. Pat. No. 9,695,751. *General Electric Company*, Petitioner, v. *United Technologies Corporation*, IPR2018-01442. Filed Jul. 24, 2018.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Power Technology, "GE's H-Series Breaks 60% Fuel Efficiency Barrier", retrieved from internet https://www.power-technology.com/features/feature1084/, 2007, 8 pages.
Praisner T.J., et al., "Predictions of Unsteady Interactions Between Closely Coupled HP and LP Turbines With Co- and Counter-Rotation," Proceedings of Asme Turbo Expo, Glasgow, UK, Jun. 14-18, 2010, pp. 1-10.
Pratt & Whitney PW2000, Jane's Aero-Engines: Jane's by IHS Markit, Sep. 29, 2010, 8 pages.
Pratt & Whitney PW6000, "Jane's Aero-Engines", Jane's by IHS Markit, Nov. 22, 2010, 8 pages.
Pratt & Whitney PW8000, "Jane's Aero-Engines", Jane's by IHS Markit, Sep. 30, 2010, 7 pages.
Pratt & Whitney PW1100G geared turbofan engine. The Flying Engineer. Retrieved Nov. 4, 2017 from: http://theflyingengineer.com/flightdeck/pw1100g-gtf/.
Preliminary Opinion of the Opposition Division in the opposition to patent EP2949882, dated Mar. 13, 2019, 12 pages.
Preliminary Opinion of the Opposition Division in the Opposition to Patent EP3051078, dated Apr. 16, 2019.
Preliminary Opinion of the Opposition Division Issued in the Framework of the Opposition Procedure Against Patent EP2949881 (Application No. 15175203.7).
Preliminary Opinion of the Opposition Division Issued in the Framework of the Opposition Procedure Against Patent EP2949882 (Application No. 15175205.2), dated Mar. 13, 2019.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Princeton, "Composite Materials", https://www.princeton.edu/-humcomp/bikes/design/desi_30.htm, on Oct. 9, 2019, 1 page.
Principal Brief. *Raytheon Technologies Corporation* v. *General Electric Company*. Inter Partes Review No. PR2018-01442. Filed Aug. 7, 2020. pp. 1-59, appendices 1-98, and 60-1.
Prior Art Direct Drive Engines Statement, 1 page.
Priority document U.S. Appl. No. 14/160,601 dated Jan. 22, 2014.
Product Brochure. Garrett TFE731. Allied Signal. Copyright 1987. pp. 1-24.
Product Brochure. The ALF 502R turbofan: technology, ecology, economy. Avco Lycoming Textron.
Product Brochure, BR710, Rolls-Royce, Copyright 2008, pp. 1-4.
Product Brochure, "TFE731 Engines: A new generation meeting your highest expectations for reliability, cost of ownership and performance", Allied Signal Aerospace, Copyright 1996. pp. 1-10.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Shah, D.M. (1992). MoSi2 and other silicides as high temperature structural materials. Superalloys 1992. The Minerals, Metals, & Materials Society. pp. 409-422.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singapore Search Report and Written Opinion for Application No. 10201401514U, mailed May 26, 2017, 15 pages.
Singapore Search Report and Written Opinion for Application No. SG11201402942Q dated Mar. 4, 2015, 28 pages.
Singh, A. (2005). Application of a system level model to study the planetary load sharing behavior. Jounal of Mechanical Design. vol. 127. May 2005. pp. 469-76.
Singh, Avinash, Load Sharing Behavior in EpicyclicGears:Physical Explanation and Generalized Formulation. Mechanism and Machine Theory, vol. 45. 2010, 20 pgs.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith Jr M.G., et al., "P&W propulsion systems studies results/status," National Aeronautics and Space Administration First Annual High Speed Research Workshop, May 14-16, 1991, pp. 921-948.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Statement of Appeal filed by Safran in European Patent No. EP2809931 (13743042.7) Mar. 22, 2019.
Statement of Grounds for Appeal for European Patent No. 2809931 (13743042.7) mailed Apr. 8, 2019.
Suchezky M., et al., "Variable—speed power-turbine for the large civil tilt rotor," Prepared for NASA. NASA/CR-2012-217424, Feb. 2012, pp. 1-89.
Summons to attend oral proceedings for Application No. 15777258.3 dated Feb. 1, 2021. 13 pgs.
Summons to Attend Oral Proceedings for European Patent Application No. 14155460.0 (2811120) mailed Oct. 15, 2021.
Summons to Attend Oral Proceedings for European Patent Application No. EP13743283.7 (Patent No. EP2809932), dated May 28, 2019.
Summons to Attend Oral Proceedings for European Patent Application No. EP13777804.9 dated Dec. 10, 2019.
Summons to attend oral proceedings for European Patent Application No. EP13777804.9, dated Jul. 7, 2020.
Summons to Attend Oral Proceedings for European Patent Application No. EP13778330.4 (EP2809922) dated Dec. 2, 2019.
Summons to Attend Oral Proceedings for European Patent Application No. EP13822569.3 (EP2841718), dated Oct. 23, 2019, 13 pages.
Summons to Oral Proceedings for European Patent Application No. 2809931 (13743042.7) mailed May 10, 2021.

(56) References Cited

OTHER PUBLICATIONS

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-23.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-46.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Team CCJ. Turbine blade, vane cooling—a primer. Retrieved Oct. 9, 2019 from: https://www.ccj-online.com/turbine-blade-vane-cooling-a-primer/.
Technical Data. Teflon. WS Hampshire Inc. Retrieved from: http://catalog.wshampshire.com/Asset/psg_teflon_ptfe.pdf.
The jet engine. Rolls-Royce plc. 5th Edition. 1996. pp. 48.
Third Party Observation submitted for EP Application No. EP16156289.7 (Patent No. EP3059393), by Rolls Royce dated Jun. 19, 2019, 5 pages.
Third Party Observations and Concise Description of Relevance of Document for U.S. Appl. No. 15/185,292 dated Jul. 5, 2018.
Third Party Observations and Concise Description of Relevance of Document for U.S. Appl. No. 15/816,487 dated Jul. 25, 2018.
Third Party Observations and Concise Description of Relevance of Document for U.S. Appl. No. 15/856,396 dated Aug. 31, 2018, 32 pages.
Third Party Observations and Concise Description of Relevance of Document for U.S. Appl. No. 15/881,240 dated Aug. 31, 2018.
Third Party Observations for EP Application No. 17199484.1 (EP3296526) dated Oct. 30, 2019 by Rolls Royce.
Third Party Observations for EP Application No. EP11250208.3 (EP2362064), filed Jul. 20, 2018, dated Jul. 26, 2018, 12 pages.
Third Party Observations for EP Application No. EP113854452.3 by Rolls Royce dated Dec. 13, 2018, mailed Jan. 2, 2019, 9 pages.
Response to Opposition—opposed by Rolls Royce. EP Patent No. 3045684 Application No. 16159312.4 Jul. 5, 2021.
Response to Opposition—opposed by Rolls Royce EP Patent No. 3098396 Application No. 16174051.9 Jul. 5, 2021.
U.S. Appl. No. 13/558,605, filed Jul. 26, 2012, 18 pages.
U.S. Appl. No. 13/629,681, filed Sep. 28, 2012, 38 pages.
U.S. Appl. No. 13/645,606, filed Oct. 5, 2012, 36 pages.
U.S. Appl. No. 13/645,626, filed Oct. 5, 2012, 34 pages.
U.S. Appl. No. 13/645,665, filed Oct. 5, 2012, 34 pages.
U.S. Appl. No. 13/645,773, filed Oct. 5, 2012, 35 pages.
U.S. Appl. No. 13/645,807, filed Oct. 5, 2012, 34 pages.
U.S. Appl. No. 13/719,620, filed Dec. 19, 2012, 16 pages.
U.S. Department of Transportation: Federal Aviation Administration Advisory Circular. Calibration test, endurance test, and teardown inspection for turbine engine certification. Dated Apr. 13, 2006. pp. 1-41 and Appendices.
U.S. Department of Transportation: Federal Aviation Administration Advisory Circular, Engine Overtorque Test, Calibration Test, Endurance Test, and Teardown Inspection for Turbine Engine Certification, dated Mar. 9, 2015, pp. 1-37 and Appendices.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E00064EN. Dated: Nov. 24, 2006, pp. 1-5.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Velex, P. (2012). On the modelling of spur and helical gear dynamic behaviour. In. Dr. M. Gokcek (Ed), Mechanical engineering, InTech, 2012. DOI: 10.5772/36157.
Walsh, P. (2004). Gas turbine performance: 5.11.6 Radial flow turbines versus axial flow turbines. John Wiley and Sons. Blackwell Science, Second Edition. p. 214.
Walsh, P.P. and Fletcher, P. (2004). Gas turbine performance, 2nd Edition. Oxford, UK: Blackwell Science. pp. 1-658.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Warwick G., "Textron Lycoming LF507: Engine for Change," Flight International, Aug. 31, 1993, pp. 39-41.
Waters, M.H. and Schairer, E.T. (1977). Analysis of turbofan propulsion system weight and dimensions. NASA Technical Memorandum. Jan. 1977. pp. 1-65.
Web Article, GE Aviation, GEnx-28 first engine to test, Jan. 28, 2012, Retrieved from: http://www.geaviation.com/engines/commercial/genx/2b_fett.html, 1 page.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Welch G.E. (2010). Assessment of aerodynamic challenges of a variable-speed power turbine for large civil tilt-rotor application. Prepared for 66th Annual Forum and Technology Display. May 11-13, 2010. NASA/TM-2010-216758. pp. 1-15.
Welch, G.E., McVetta, A.B., Stevens, M.A., Howard, S.A., Giel, P.W., Ameri, A.A., To, W., et al. (2012). Variable-speed power-turbine research at Glenn Research Center. Prepared for the 68th Annual Forum and Technology Display. May 1-3, 2012. NASA/TM-2012-217605. pp. 1-23.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
"Wide-chord fan—12 years of development", Aircraft Engineering and Aerospace Technology, Jul. 1987, vol. 59, Issue 7, pp. 10-11, Retrieved Jul. 31, 2008 from: https://doi.org/10.1108/eb036471.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.

(56) References Cited

OTHER PUBLICATIONS

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Youtube Video, "Pure Power PW1000G Engine: Customer Testimonials", published Jul. 26, 2010 (-seconds 43-63) available at https:www.youtube.com/watch?v=vgQgEftEd8c on Aug. 9, 2018.
Palud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
*Raytheon Techs. Corp.* V. *General Electric Co.*, 993 F.3d 1374 (Fed. Cir. 2021).
Read, B. (2014). Powerplant revolution. AeroSpace. May 2014. pp. 28-31.
Red Aviation, "Part or Material Certification Form for various engine components," dated Apr. 5, 2017, 1 page.
Request for Opinion as to Validity for European Patent No. EP2809922 (13778330.4), dated Feb. 6, 2019 by Rolls Royce, 16 pages.
Request for Opinion as to Validity for European Patent No. EP2809922 (13778330.4), dated Feb. 14, 2019 by Rolls Royce, 16 pages.
"Request for Opinion as to Validity of European Patent No. EP2809922B1 (EP13778330.4) Observations-in-Reply," by Rolls-Royce, dated Apr. 3, 2019.
Request for Opinion filed for European Patent No. EP2532841B1 by Rolls Royce granted Apr. 27, 2016, dated Nov. 7, 2018.
Request for Opinion filed for European Patent No. EP2532858B1 by Rolls Royce granted Oct. 19, 2016, dated Nov. 7, 2018.
Request for Opinion filed for European Patent No. EP2737180B1 by Rolls Royce granted Apr. 13, 2016, dated Jul. 11, 2018.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Response to Appeal for European Patent No. 2809931 (13743042.7) mailed Aug. 22, 2019.
Response to Holder's Response European Patent No. EP2949882 by Safran Aircraft Engines dated Mar. 12, 2019. [with English translation].
Response to Observations by Patantee filed for European Patent No. EP2532841B1 by Rolls Royce granted Apr. 27, 2016, dated Jan. 18, 2019.
Response to Observations by Patantee filed for European Patent No. EP2532858B1 by Rolls Royce granted Oct. 19, 2016, dated Jan. 18, 2019.
Response to Observations by Patantee filed for European Patent No. EP2737180B1 by Rolls Royce granted Apr. 13, 2016, dated Jul. 18, 2018.
Response to Opposition for European Patent No. EP2949882 (EP Application No. 15175205.2) dated Nov. 26, 2018.
Response to Statement of Grounds of Appeal from the Patent Holder for European Patent No. 2809931 by Safran Aircraft Engine dated Aug. 21, 2019. [with English translation].
Response to the Observations Filed by Patent Holder for European Patent No. EP2809922, dated Apr. 29, 2020.
Response to the Summons of Oral Proceedings for European Patent No. EP2949882 by Rolls-Royce, dated Oct. 9, 2019.
Response to the Summons of Oral Proceedings for European Patent No. EP2949882 by Safran, dated Oct. 9, 2019.
Response to the Summons of Oral Proceedings for European Patent No. EP3051078 by Rolls-Royce, dated Oct. 17, 2019.
Response to the Summons to Oral Proceedings in European Patent Application No. 15175203.7(EP2949881) by Rolls-Royce plc dated Mar. 25, 2021. pp. 1-9.
Response to the Summons to Oral Proceedings in EuropeanPatent Application No. 15175203.7 (EP2949881) by Safran dated Mar. 25, 2021.pp. 1-11.
Rethinking jet engines to make commercial aviation less of a threat to the climate (and the human respiratory system). Fortune. Retrieved Sep. 29, 2016 from: http://beta.fortune.com/change-the-world/united-technologies-8.
Reuters. (2014). GE exec says avoided geared design in jet engine battle with Pratt. Retrieved from: https://www.reuters.com/article/us-general-electric-united-tech-engine/ge-exec-says-avoided-geared-design-in-jet-engine-battle-with-pratt-idUSKBN0HA2H620140915.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N., "Advanced prop-fan engine technology (APET) single- and counter-rotation gearbox/pitch change mechanism," Prepared for NASA, NASA CR-168114 (vol. II), Jul. 1985, pp. 1-175.
Rolls-Royce M45H. Jane's Aero-engines, Aero-engines-Turbofan. Feb. 24, 2010.
"Rolls-Royce Trent 900," Jane's Aero-Engines, Jane's by IHS Markit, Feb. 8, 2012.
"Rolls-Royce Trent XWB," Jane's Aero-Engines, Jane's by IHS Markit, Mar. 6, 2012.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Roux E., "Turbofan and turbojet engines database handbook," Editions Elodie Roux, Blagnac: France, 2007, pp. 41-43 and 464-469.
Roux E., "Turbofan and turbojet engines database handbook", Editions Elodie Roux. Blagnac: France, 2007, pp. 41-42, pp. 465, pp. 468-469.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Summons to Attend Oral Proceedings in European Patent Application No. 16159312.4 dated Dec. 10, 2021.
Summons to Attend Oral Proceedings in European Patent Application No. 16174051.9 dated Dec. 10, 2021.
Decision Revoking EP Patent 3045864 (App 161593124) Jul. 22, 2022.
Decision Revoking EP Patent 3098396 (App 161740519) Jul. 22, 2022.
Du S., "Modelling of Spur Gear Mesh Stiffness and Static Transmission Error", 1998, Proc Instn Mech Engrs, vol. 212, Part C, 11 pages.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-3.18 and 12.7-12.21.

(56) References Cited

OTHER PUBLICATIONS

Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
El-Sayad, A.F. (2008). Aircraft propulsion and gas turbine engines. Boca Raton, FL: CRC Press. pp. 215-219 and 855-860.
Engine Alliance GP7200. Jane's Aero-Engines. Jane's by IHS Markit. Jul. 12, 2010.
English Translation of Measurement and Calculation Methodology on TFE731-2, TFE731-3A and TFE731-3D Models, 14 pages.
EP Office Action for Application No. EP16159312.4, dated Oct. 16, 2018, 10 pages.
EP Office Action for Application No. EP16174051.9, dated Oct. 15, 2018, 28 pages.
EP Office Action for Application No. EP17199484.1, dated Jan. 2, 2019, 5 pages.
European Extended Search Report for Application No. EP19199343.5, dated Jan. 10, 2020, 8 pages.
European Search Report for Application No. EP12170479.5 dated Jun. 26, 2014.
European Search Report for Application No. EP12170483.7 dated Apr. 29, 2014.
European Search Report for Application No. EP13743042.7, dated Aug. 14, 2015, 9 pages.
European Search Report for Application No. EP13828967.3, dated Oct. 14, 2014, 3 pages.
European Search Report for Application No. EP14155460.0, dated Sep. 2, 2014, 9 pages.
European Search Report for Application No. EP15152745.4, dated Jun. 15, 2015, 7 pages.
European Search Report for Application No. EP15175203.7 dated Oct. 15, 2015.
European Search Report for Application No. EP15175205.2 dated Oct. 15, 2015.
European Search Report for Application No. EP15777258.3 dated Apr. 10, 2017.
European Search Report for Application No. EP16159312.4 dated Jun. 8, 2016.
European Search Report for Application No. EP16174051.9, dated Oct. 21, 2016, 10 pages.
European Search Report for Application No. EP17199484.1 dated Feb. 7, 2018.
European Search Report for Application No. EP18191325.2 dated Mar. 7, 2019.
European Search Report for Application No. EP18191333.6 dated Mar. 7, 2019.
Extended European Search Report for Application No. EP16155413.4 dated Jul. 5, 2016.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Final Written Decision. *General Electric Company*, Petitioner, v. *United Technologies Corp.*, Patent Owner. PR2018-01442. U.S. Pat. No. 9,695,751. Entered Feb. 20, 2020. pp. 1-72.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fitzpatrick G.A., et al., "Diffusion Bonding Aeroengine Components," Def Scie J , Oct. 1998 , vol. 38, Issue. 4, pp. 477-485.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Foreign Copy and English Translation on the back of Opposition to European Patent No. EP3097275, granted Sep. 25, 2019, filed on behalf of Safran Aircraft Engines, dated Jul. 1, 2020.
Foreign Copy—Third Party Observation submitted by Safran for EP Application No. 14155460.0, Patent No. EP2811120, on Feb. 15, 2019, Translation to follow at a later date.
Fowler T.W., "Jet Engines and Propulsion Systems for Engineers," GE Aircraft Engines, Training and Educational Development and the University of Cincinnati for Human Resource Development, 1989, pp. 1-516.
Garder W.B., "Energy efficient engine flight propulsion system preliminary analysis and design report," NASA CR-159487, 1979, pp. 1-450.
Gardner W.B. (1979). Energy efficient engine: High pressure turbine uncooled rig technology report. NASA-CR-165149. Oct. 1979, pp. 1-242.
Garret TFE731 Turbofan Engine (CAT C). Chapter 79: Lubrciation System. TTFE731 Issue 2. 2010. pp. 1-24.
Gas Turbine Technology, "Introduction to a Jet Engine", Rolls-Royce plc, Dec. 2007.
Gates, D. Bombardier flies at higher market. Seattle Times. Jul. 13, 2008. pp. C6.
GE Reports (2009). GE's breakthrough GEnx debuts at the Paris Air Show. Retrieved Jun. 6, 2009 from: http://www.gereports.com/ges-breakthrough-genx-debuts-at-the-paris-air-show/.
Reply to the Observations for European Patent No. EP3097275 (15777258.3) dated Aug. 18, 2021.
Letter from the Opponent for European Patent Application No. 2811120 (14155460.0) mailed Feb. 15, 2019 by Safran Aircraft Engines.
Etter from the Opponent (Safran) for European Patent 2949881 (15175203.74) dated Mar. 25, 2021.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Lynwander P., "Gear Drive Systems: Design and Application," American Lohmann Corporation, New Jersey, 1983, Marcel Dekker Inc., NY and Basel, GE-1018.008, paragraphs 2-4, p. 327.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104,

(56) References Cited

OTHER PUBLICATIONS 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mattingly J.D., "Aircraft Engine Design," American Institute of Aeronautics and Astronautics Inc, 2nd Edition, Jan. 2002, pp. 292-322.
Mattingly J.D., "Elements of Gas Turbine Propulsion", New York, New York: McGraw-Hill, Inc. preface, 1996, pp. 719-720, 727-731, 735-738, 928-929, and 936-937.
Mattingly, Textbook, XP008174593, pp. 292.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McCracken, R.C. (1979). Quiet short-haul research aircraft familiarization document. NASA-TM-81149. Nov. 1, 1979. pp. 1-76.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Meier N., "Civil Turbojet/Turbofan Specifications", 2005, retrieved from http://jet-engine.net/civtfspec.html , 8 pages.
Meyer, A.G. (1988). Transmission development of Textron Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. Nasa CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nagendra S., et al., "Optimal rapid multidisciplinary response networks: Rapiddisk," Structural and Multidisciplinary Optimization, Springer, Berlin, DE, vol. 29, No. 3, Mar. 1, 2005, pp. 213-231.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
NASA, Engine Weight Model, Glenn Research Center, Retrieved from, http://www.grc.nasa.gov/WWW/K-12/airplane/turbwt.html, Mar. 11, 2016.
NASA Lewis Research Center, Quiet Clean Short HaulExperimental Engine (QCSEE) Main Reduction Gears Detailed Design Final report. NASA CR_134872, Mar. 1975. 222 pgs.
NASA, Quest for Performance: The Evolution of Modem Aircraft, Part II: the Jet Age, Chapter 10: Technology of the Jet Airplane, Turbo jet and Turbofan Systems, Dec. 2006, NASA.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption. NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Norton, M. and Karczub, D. (2003). Fundamentals of noise and vibration analysis for engineers. Press Syndicate of the University of Cambridge. New York: New York. p. 524.
Notice of Opposition by Rolls Royce of European Patent No. 2809939 (European Patent Application No. 13786893.1) dated Sep. 26, 2018, 30 pages.
Notice of Opposition for European Patent No. 2809922 (13778330.4) dated Mar. 18, 2019 by Rolls-Royce plc.
Notice of Opposition for European Patent No. 2809922 (13778330.4) dated Mar. 20, 2019 by Safran Aircraft Engines.
Notice of Opposition for European Patent No. 2809932 (13743283.7) dated Sep. 20, 2018 by Safran Aircraft Engines.
Notice of Opposition for European Patent No. 2949882 (15175205.2) dated May 23, 2018 by Safran Aircraft Engines.
Third Party Observations for EP Application No. EP12170483.7 by Rolls-Royce dated Oct. 24, 2019.
Third Party Observations for EP Application No. EP13743282.9 (EP2809953) by Rolls-Royce dated Dec. 13, 2018.
Third Party Observations for EP Application No. EP13743282.9 (EP2809953) by Rolls-Royce dated Sep. 20, 2018, 10 pages.
Third Party Observations for EP Application No. EP13775036.0 by Rolls Royce dated Dec. 13, 2018, mailed Jan. 2, 2019, 7 pages.
Third Party Observations for EP Application No. EP13775036.0 by Rolls Royce dated Oct. 11, 2018, mailed Oct. 17, 2018, 6 pages.
Third Party Observations for EP Application No. EP13775188.9 by Rolls Royce dated Dec. 13, 2018, mailed Jan. 2, 2019, 7 pages.
Third Party Observations for EP Application No. EP13775188.9 by Rolls Royce dated Sep. 10, 2018, mailed Sep. 17, 2018, 7 pages.
Third Party Observations for EP Application No. EP13777804.9, by Rolls Royce dated Dec. 19, 2018, mailed Jan. 2, 2019, 8 pages.
Third Party Observations for EP Application No. EP13777804.9 (EP2809940), by Rolls-Royce, dated Nov. 21, 2019, 3 pages.
Third Party Observations for EP Application No. EP13822569.3 (EP2841718) by Rolls-Royce dated Sep. 10, 2018, 9 pages.
Third Party Observations for EP Application No. EP13822569.3 (EP2841718) dated Dec. 13, 2018.
Third Party Observations for EP Application No. EP14155460.0 (EP2811120) by Rolls Royce dated Oct. 29, 2018.
Third Party Observations for EP Application No. EP16159312.4 (EP3045684), filed Jun. 22, 2018, dated Jul. 3, 2018, 16 pages.
Third Party Observations for EP Application No. EP16174051.9 (EP3098396), filed Jun. 26, 2018, dated Jul. 9, 2018, 12 pages.
Third Party Observations for EP Application No. EP17199484.1 (EP3296526), filed Jul. 5, 2018, dated Jul. 12, 2018, 26 pages.
Third Party Observations for EP Application No. EP18191325.2 (EP3608515) by Rolls Royce dated Mar. 10, 2020.
Third Party Observations for EP Application No. EP18191325.2 (EP3608515) by Rolls Royce dated Mar. 6, 2020.
Third Party Observations for EP Application No. EP18191333.6 (EP3467273) by Rolls Royce dated Mar. 9, 2020.
Third Party Observations for EP Application No. EP2809940 by Rolls Royce dated Mar. 30, 2020.
Third Party Submission and Concise Description of Relevance of Document for U.S. Appl. No. 15/881,240 dated Aug. 28, 2018, 36 pages.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Treager, I.E. (1995). Aircraft gas turbine engine technology, 3rd Edition. GLENCOE Aviation Technology Series. McGraw-Hill. p. 445.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

(56) References Cited

OTHER PUBLICATIONS

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines- Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. A23WE, "Department of Transportation Federal Aviation Administration", Oct. 25, 2001, pp. 1-23.
Type Certificate Data Sheet No. E6NE. Department of Transportation Federal Aviation Administration. Jun. 7, 2002. pp. 1-10.
Unicom, "Flying Magazine", Nov. 2002, vol. 129, No. 11, p. 68.
U.S. Appl. No. 13/408,109, filed Feb. 29, 2012, "Geared Turbofan Architecture for Improved Thrust Density".
U.S. Appl. No. 61/494,453, Geared engine flexible mount arrangement. filed Jun. 8, 2011.
United Technologies Pratt & Whitney, Jane's Aero-Engines, Jane's by IHS Markit, Aug. 30, 2000.
U.S. Appl. No. 13/363, 154, filed Jan. 31, 2012, 13 pages.
U.S. Appl. No. 13/365,288, filed Feb. 3, 2012, 20 pages.
U.S. Appl. No. 13/407,795, filed Feb. 29, 2012, 19 pages.
U.S. Appl. No. 13/410,776, filed Mar. 2, 2012, 15 pages.
U.S. Appl. No. 13/437,270, filed Apr. 2, 2012, 15 pages.
U.S. Appl. No. 13/437,290, filed Apr. 2, 2012, 15 pages.
U.S. Appl. No. 13/437,304, filed Apr. 2, 2012, 14 pages.
U.S. Appl. No. 13/445,095, filed Apr. 12, 2012, 16 pages.
U.S. Appl. No. 13/446,194, filed Apr. 13, 2012, 17 pages.
U.S. Appl. No. 13/446,312, filed Apr. 13, 2012, 16 pages.
U.S. Appl. No. 13/446,510, filed Apr. 13, 2012, 19 pages.
U.S. Appl. No. 13/455,198, filed May 25, 2012, 16 pages.
U.S. Appl. No. 13/455,235, filed Apr. 25, 2012, 18 pages.
U.S. Appl. No. 13/459,498, filed Apr. 30, 2012, 15 pages.
U.S. Appl. No. 13/483,406, filed May 30, 2012, 20 pages.
U.S. Appl. No. 13/484,589, filed May 31, 2012, 13 pages.
2003 NASA seal/secondary air system workshop. (2003). NASA/CP-2004-212963/vol. 1. Sep. 1, 2004. pp. 1-408.
(2012). Gas Power Cycle—Jet Propulsion Technology, A case study. Machine Design Magazine. Nov. 5, 1998. Retrieved from: http://machinedesign.com/content/pw8000-0820.
About GasTurb. Retrieved Jun. 26, 2018 from: http://gasturb.de/about-gasturb.html.
Adams, et al., "The World's Hugest Jet Engine Is Wider Than a 737's Fuselage", Apr. 28, 2016, www.wired.com/2016/04/worlds-hugest-jet-engine-wider-737s-fuselage/ accessed on Apr. 28, 2016, 5 pages.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
AGMA Information Sheet, "Double Helical Epicyclic Gear Units," ANSI-AGMA 940-A09, Approved Jan. 6, 2009, pp. 1-22.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Annex to Communication 94(3) EPC—EP3296526—Feb. 27, 2020 (Application No. 17199484.1).
Annex to Communication 94(3) EPC—Patent EP3296526—Feb. 1, 2019 (Application No. 17199484.1).
Annex to the Notice on Article 94(3) EPC issued by the Examination Division for European Patent Application No. 13837107.5 mailed Jan. 25, 2019.
Annexe Mesures—Methodologie de mesure et de calcul, cited in: Notice of Opposition for European Patent No. 2809932 mailed Oct. 1, 2018.
Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.
Annotation of Edkins D.P., et al., "TF34 Turbofan Quiet Engine Study," Final Report prepared for NASA, NASA-CR-120914, Jan. 1, 1972, p. 92.
Annotation of Gray D.E., "Energy Efficient Engine Preliminary Design and Integration Studies," Prepared for NASA, NASA CR-135396, Nov. 1978, p. 70.
Appeal from the United States Patent and Trademark Office, Patent Trial and Appeal Board in No. IPR2018-01442. *Raytheon TechnologiesCorporation* v. *General Electric Company*. Decided Apr. 16, 2021. pp. 1-14.
Appellant's Reply Brief. *Raytheon Technologies Corporation* v. *General Electric Company*. Inter Partes Review No. IPR2018-01442. Filed Oct. 26, 2020. pp. 1-32.
ASME International Gas Turbine Institute, "Trends in the Global Energy Supply and Implications for the Turbomachinery Industry", Global Gas Turbine News, Apr. 2013, vol. 53, Issue. 2, pp. 49-53.
Attestation for Didier Escure Signed Sep. 17, 2018, cited in: Notice of Opposition for European Patent No. 2809932 mailed Oct. 1, 2018.
Attestation of Philippe Pellier signed Apr. 12, 2017, cited in: Notice of Opposition by Safran for European Patent No. EP 2809931 dated Apr. 20, 2017.
August R., "Dynamics of Planetary Gear Trains", Jun. 1984, NASA Contractor Report 3793, pp. 13-16.
Avco Lycoming Divison. ALF 502L Maintenance Manual. Apr. 1981. pp. 1-118.
Aviadvigatel D-110. Jane's Aero-engines, Aero-engines-Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bijewitz J., et al., "Architectural Comparison of Advanced Ultra-High Bypass Ratio Turbofans for Medium to Long Range Application," Deutscher Luft- und Raumfahrtkongress, 2014, pp. 1-12.

(56) References Cited

OTHER PUBLICATIONS

Bloomer, H.E. and Loeffler, I.J. (1982). QCSEE over-the-wing engine acoustic data. NASA-TM-82708. May 1, 1982. pp. 1-558.
Bloomer, H.E., Loeffler, I.J., Kreim, W.J., and Coats, J.W. (1981). Comparison of NASA and contractor resits from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-C367-C9-373.
Bradley A., "Presentation: Engine Design for the Environment," Rolls-Royce, RAeS—Hamburg, Jun. 24, 2010, 64 pages.
Brennan, P.J. and Kroliczek, E.J. (1979). Heat pipe design handbook. Prepared for National Aeronautics and Space Administration by B & K Engineering, Inc. Jun. 1979. pp. 1-348.
Brief Communication from Opponent after Oral Proceedings for European Patent Application No. 13743283.7 (2809932), by Safran Aircraft Engines, dated Dec. 2, 2019.
Brief for Appellee. *Raytheon Technologies Corporation* v. *General Electric Company*. Inter Partes Review No. IPR2018-01442. Filed Sep. 23, 2020. pp. 1-68.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
General Electric CF34, "Jane's Aero-Engines", Jane's by IHS Markit, Jul. 26, 2010, 24 pages.
General Electric GE90, "Jane's Aero-Engines", Jane's by IHS Markit. Nov. 1, 2010, 12 pages.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Grose T.K. (2013). Reshaping flight for fuel efficiency: Five technologies on the runway. National Geographic. Mar. 16, 2016. Retrieved Apr. 23, 2013 from: http://news.nationalgeographic.com/news/energy/2013/04/130423-reshaping-flight-for-fuel-efficiency.html.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Grzegorz Litak., et al., "Dynamics of a Gear System with Faults in Meshing Stiffness," Nonlinear Dynamics, Kluwer Academic Publishers, DO, vol. 41, No. 4, Sep. 1, 2005, pp. 415-421.
Guha, "Optimum Fan Pressure Ratio for Bypass Engines with Separate or Mixed Exhaust Streams", Journal of Propulsion and Power, vol. 17, No. 5. Sep.- Oct. 2001, pp. 1117-1122, [retrieved on Aug. 21, 2013]. Retrieved from the Internet: http://www.facweb.iitkgp,ernet.in/.about.aguha/research/AIAA2001- .pdfentire document.
Gunston B., "Allied Signal TFE731," Jane's Aero Engine Issue Five, Mar. 1999.
Gunston B., "Jane's Aero-engines", Issue Seven, Janes Information Group Inc, Alexandria, Virgina, 2000, pp. 1-47, 61, 464-512.
Gunston B., "Pratt & Whitney PW6000," Jane's Aero Engine Issue Six, Sep. 1999.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., et al., "Analysis of turbofan design options for an advanced single-aisle transport aircraft", American Institute of Aeronautics and Astronautics, 2009, pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Halle J.E., et al., "Energy Efficient Engine Fan Component Detailed Design Report," NASA-CR-165466, 1984, pp. 1-135.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hendricks E.S., Jones, S.M., and Gray, J.S. (2014). Design optimization of a variable-speed power-turbine. American Institute of Aeronautics and Astronautics. pp. 1-17.
Hicks R.J., et al., "Optimised Gearbox Design for Modern Wind Turbines," Orbital2 Ltd, Wales, UK, Nov. 20, 2014, pp. 1-8.
Hill, P.G., Peterson, C.R. (1965). Mechanics and thermodynamics of propulsion. Addison-Wesley Publishing Company, Inc. pp. 307-308.

(56) References Cited

OTHER PUBLICATIONS

Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Holder's Response to Written Opinion of Sep. 29, 2015, European Patent Application No. 15175205.2 (2949882), mailed Jun. 1, 2016, 27 pages.
Honeywell Learjet 31 and 35/36 TFE731-2 to 2C Engine Upgrade Program. Sep. 2005. pp. 1-4.
Honeywell LF502. Jane's Aero-engines, Aero-engines-Turbofan. Feb. 9, 2012.
Honeywell LF502. Jane's Aero-engines, Aero-engines-Turbofan. Aug. 17, 2016.
Honeywell LF507. Jane's Aero-engines, Aero-engines-Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines-Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
Interlocutory decision in opposition proceedings for European Patent Application No. 13743042.7 mailed Nov. 26, 2018.
Interlocutory decision in opposition proceedings for European Patent Application No. 13778330.4 mailed May 17, 2021.
International Organization for Standardization, "Calculation of Load Capacity of Spur and Helical Gears—Part 1: Basic Principles, Introduction and General Influence Factors (ISO/DIS Standard No. 6336-1)", 2006.
International Preliminary Report on Patentability for International Application No. PCT/US2013/060105, dated on Apr. 2, 2015, 6 pages.
International Preliminary Report on Patentability for International Application No. PCT/US2015/012346 dated on Aug. 4, 2016.
International Search Report and Written Opinion for PCT Application No. PCT/US2013/021878, dated on Mar. 13, 2013, 10 pages.
International Search Report and Written Opinion for PCT Application No. PCT/US2013/060105 dated on Feb. 19, 2014.
Ivchenko-Progress AI-727M. Jane's Aero-engines, Aero-engines-Turbofan. Nov. 27, 2011.
Ivchenko-Progress D-436. Jane's Aero-engines, Aero-engines-Turbofan. Feb. 8, 2012.
Ivchenko-Progress D-727. Jane's Aero-engines, Aero-engines-Turbofan. Feb. 7, 2007.
Jacobson, N.S. (1993). Corrosion of silicon-based ceramics in combustion environments. J. Am. Ceram. Soc. 76(1). pp. 3-28.
"Jane's Aero-Engines", Edited by Bill Gunston, Jane's Information Group Inc., Alexandria, Virginia, 2000, Issue Seven, pp. 1-67, 464-470, 475-476, 482-488, 494-508, 510-512.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148 (8). p. 32-4.
Kang M.R. (2009). Measurement of vibrations of gears supported by compliant shafts. Ohio University. Retrieved Oct. 7, 2019 from https://etd.ohiolink.edu/letd.send_fileaccession=osu1253021230&disposition=attachment.
Kapelevich, "High Gear Ratio Epicyclic Drives Analysis," Jun. 2014, American Gear Manufacturers Association, geartechnology.com , pp. 62-67.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kellner T., "The World's Largest Jet Engine is Already More Powerful than America's First Manned Space Rocket," GE Reports, May 19, 2016, [Retrieved on Oct. 12, 2017], Retrieved from the Internet: URL: https://www.ge.com/reports/the-worlds-largest-jet-engine-is-already-more-powerful-than-americas-first-manned-space-rocket/.
Kerrebrock, J.L. (1977). Aircraft engines and gas turbines. Cambridge, MA: The MIT Press. p. 11.
Kiekbusch T., et al., "A common formula for the combined torsional mesh stiffness of spur gears", 5th Australasian Congress on Applied Mechanics, ACAM 2007, Dec. 10-12, 2007, pp. 1-7.
Kjelgaard, C. (2010). Gear up for the GTF. Aircraft Technology, 105. Apr.-May 2010. pp. 86, 88, 90, 92-95.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Lacaze J., et al., "Directionally Solidified Materials: Nickel-Base Superalloys for Gas Turbines," Textures and Microstructures, 1990, vol. 13, pp. 1-14.

(56) References Cited

OTHER PUBLICATIONS

Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Carney, K., Pereira, M. Revilock, and Matheny, P. (2003). Jet engine fan blade containment using two alternate geometries. 4th European LS-DYNA Users Conference. pp. 1-10.
CFM International CFM56, Jane's Aero-Engines, Janes by IHS Markit, Jan. 31, 2011, 36 pages.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Co-pending U.S. Appl. No. 14/160,601, inventor Roberge et al, filed Jun. 11, 2009.
Coppinger, R. (2007). MTU Aero Engines designs High-Speed Turbine for P&W's GTF Geared Turbofan. Flight International. [accessed Oct. 13, 2017 at https://www.flightglobal.com/news/articles/mtu-aero-engines-designs-high-speed-turbine-for-pw-217631/].
Coy, Peter. The little gear that could reshape the jet engine: A simple idea's almost 30-year, $10 billion journey to the aircraft mainstream. Bloomberg Business. Oct. 15, 2015. p. 1-4.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision Denying Institution of Inter Partes Review, *General Electric Company*, Petitioner v. *United technologies Corp.*, Patent Owner, IPR2017-00522, U.S. Pat. No. 8,899,915, Entered Jun. 23, 2017, pp. 1-18.
Decision Institution of Inter Partes Review. *General Electric Company*, Petitioner v. *United Technologies Corporation*, Patent Owner. IPR2018-01442. U.S. Pat. No. 9,695,751. Entered Feb. 21, 2019. pp. 1-25.
Decision of the Opposition Division, European Patent No. 2949882 (Application No. 15175205.2) dated Nov. 26, 2018.
Decision of the Opposition Division for European Patent No. 2811120 (14155460.0), dated Jan. 15, 2020.
Decision Revoking European Patent EP2809939 (13786893.1) by the Opposition Division mailed Aug. 5, 2021.
Decision to Deny Institution-Case IPR2018-01171, U.S. Pat. No. 8,297,916B1, *General Electric Company*, Petitioner v, *United Technologies Corporation*, Patent owner, Entered Nov. 29, 2018, 17 pages.
Decision to Deny Institution-Case IPR2018-01172, U.S. Pat. No. 8,297,916B1, *General Electric Company*, Petitioner v, *United Technologies Corporation*, Patent owner, Entered Nov. 29, 2018, 58 pages.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Courtney H. Bailey, In re United States Patent Application 8,511,605, Executed Jul. 19, 2016, pp. 1-4.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of Dr. Magdy Attia In re U.S. Pat. No. 9,695,751, Executed Jul. 12, 2018, pp. 1-114 and appendices.
Declaration of John Eaton, Ph.D. In re U.S. Pat. No. 8,869,568, Executed Mar. 28, 2016, pp. 1-87.
Declaration of Magdy Attia in re U.S. Pat. No. 8,899,915, Executed Dec. 13, 2016, pp. 1-71.
Declaration of Raymond Drago., In re U.S. Pat. No. 8,297,916, IPR2018-01172, Executed May 29, 2018, pp. 1-115.
Declaration of Raymond Drago, In re U.S. Pat. No. 8,899,915 under 37 C.F.R. 1.68. Executed Dec. 9, 2016, pp. 1-38.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Deventer O.V., "Extreme Reduction—11 Million to One Gearing," Shapeways.com, [Retrieved on Nov. 13, 2017], https://www.shapeways.com/product/EQJQZEVWU/extreme-reduction-11-million-to-one-gearing.
Diagram of Prior Art V2500 and PW4090 Engines, 1 page.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Dr. Raymond G. Tronzo v. Biomet Inc. 156 F.3d 1154, 1998.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model devel-

(56) References Cited

OTHER PUBLICATIONS opment and test validation. 1987 MSC NASTRAN World Users Conference. Los Angeles, CA. Mar. 1987. pp. 1-14.
Opposition Proceedings Rolls Submission 161593124 May 6, 2022.
Oppostion Proceedings Rolls Submission 161740519 May 6, 2022.
Reply to an Examination Report in Opposition Porceedings in European Patent Application No. 16174051.9 (3098396) by Rolls-Royce PLC dated Apr. 11, 2023.
Reply to an Examination Report in Opposition Proceedings in European Patent Application No. 16159312.4 (3045684) by Rolls-Royce PLC dated Apr. 6, 2023.
European Search Report for European Patent Application No. 23160056.0 mailed Oct. 20, 2023.
Summons to Attend Oral Proceeds for European Patent Application No. 16174051.9 mailed Apr. 22, 2025.
Summons to Attend Oral Proceeds for European Patent Application No. 16159312.4 mailed Apr. 23, 2025.
Summons to attend oral proceedings pursuant to Rule 115(1) EPC for European Patent Application No. 16174051.9 mailed Mar. 10, 2026.
Summons to attend oral proceedings pursuant to Rule 115(1) EPC for European Patent Application No. 16159312.4 mailed Mar. 10, 2026.
Letter from the Opponent in the Opposition to European Patent No. 3098396 dated Apr. 14, 2026.

* cited by examiner

FLEXIBLE SUPPORT STRUCTURE FOR A GEARED ARCHITECTURE GAS TURBINE ENGINE

CROSS REFERENCE TO RELATED APPLICATIONS

The present disclosure is a continuation of U.S. patent application Ser. No. 16/667,154 filed Oct. 29, 2019, which is a continuation of U.S. application Ser. No. 16/125,179 filed Sep. 7, 2018, now U.S. Pat. No. 10,590,802 issued Mar. 17, 2020, which is a continuation of U.S. patent application Ser. No. 15/606,494, filed May 26, 2017, now U.S. Pat. No. 10,227,893 issued Mar. 12, 2019, which is a continuation of U.S. patent application Ser. No. 14/859,381, filed Sep. 21, 2015, now U.S. Pat. No. 10,301,968 issued May 28, 2019, which is a continuation of U.S. patent application Ser. No. 14/604,811, filed Jan. 26, 2015, now U.S. Pat. No. 9,239,012 issued Jan. 19, 2016, which is a continuation-in-part of U.S. patent application Ser. No. 13/623,309, filed Sep. 20, 2012, now U.S. Pat. No. 9,133,729, issued Sep. 15, 2015, which is a continuation-in-part of U.S. application Ser. No. 13/342,508, filed Jan. 3, 2012, now U.S. Pat. No. 8,297,916, issued Oct. 30, 2012, which claimed priority to U.S. Provisional Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

In one exemplary embodiment, a gas turbine engine includes a fan shaft that drives a fan that has fan blades. A fan shaft support that supports the fan shaft defines a fan shaft support transverse stiffness. A gear system is connected to the fan shaft and includes a gear mesh that defines a gear mesh transverse stiffness. A flexible support supports the gear system and defines a flexible support transverse stiffness. The flexible support transverse stiffness is less than 11% of the fan shaft support transverse stiffness and less than 8% of the gear mesh transverse stiffness.

In a further embodiment of any of the above, the gear mesh defines a gear mesh lateral stiffness and the gear system includes a ring gear that defines a ring gear lateral stiffness and the ring gear lateral stiffness is less than 12% of the gear mesh lateral stiffness.

In a further embodiment of any of the above, the flexible support defines a flexible support lateral stiffness and the fan shaft support defines a fan shaft support lateral stiffness and the flexible support lateral stiffness is less than 11% of the fan shaft support lateral stiffness.

In a further embodiment of any of the above, the gear system is an epicyclic gear system. The gear mesh defines a gear mesh lateral stiffness and the flexible support lateral stiffness is less than 8% of the gear mesh lateral stiffness.

In a further embodiment of any of the above, the ring gear defines a ring gear transverse stiffness that is less than 12% of the gear mesh transverse stiffness.

In a further embodiment of any of the above, a low fan pressure ratio that is measured across the fan blades alone is less than 1.45.

In a further embodiment of any of the above, the gas turbine engine has a bypass ratio greater than ten (10).

In a further embodiment of any of the above, there is a two stage high pressure turbine and a low pressure turbine with an inlet, an outlet, and a low pressure turbine pressure ratio greater than 5:1. The low pressure turbine pressure ratio is a ratio of a pressure measured prior to the inlet as related to a pressure at the outlet prior to any exhaust nozzle.

In a further embodiment of any of the above, the gear system includes a reduction ratio greater than 2.3.

In a further embodiment of any of the above, a low corrected fan tip speed is less than 1150 ft/second. The low corrected fan tip speed is an actual fan tip speed at an ambient temperature divided by $[(T_{ram}°R)/(518.7°R)]^{0.5}$. T represents the ambient temperature in degrees Rankine.

In a further embodiment of any of the above, the gear system includes a reduction ratio greater than 2.3.

In a further embodiment of any of the above, a low fan pressure ratio that is measured across the fan blades alone is less than 1.45.

In a further embodiment of any of the above, a low corrected fan tip speed is less than 1150 ft/second. The low corrected fan tip speed is an actual fan tip speed at an ambient temperature divided by $[(T_{ram}°R)/(518.7°R)]^{0.5}$. T represents said ambient temperature in degrees Rankine.

In a further embodiment of any of the above, a bypass ratio is greater than ten (10).

In a further embodiment of any of the above, there is a two stage high pressure turbine and a low pressure turbine with an inlet, an outlet, and a low pressure turbine pressure ratio greater than 5:1. The low pressure turbine pressure ratio is a ratio of a pressure measured prior to the inlet as related to a pressure at the outlet prior to any exhaust nozzle.

In another exemplary embodiment, a gas turbine engine includes a fan shaft that drives a fan that has fan blades. A fan shaft support supports the fan shaft. A gear system is connected to the fan shaft and includes a gear mesh that defines a gear mesh transverse stiffness. A flexible support supports the gear system and defines a flexible support transverse stiffness. The flexible support transverse stiffness is less than 8% of the gear mesh transverse stiffness.

In a further embodiment of any of the above, the gear system includes a ring gear that defines a ring gear transverse stiffness that is less than 12% of the gear mesh transverse stiffness.

In a further embodiment of any of the above, the fan shaft support defines a fan shaft support transverse stiffness. The flexible support transverse stiffness is less than 11% of the fan shaft support transverse stiffness.

In a further embodiment of any of the above, the fan shaft support defines a fan shaft support lateral stiffness. The flexible support defines a flexible support lateral stiffness that is less than 11% of the fan shaft support lateral stiffness.

In a further embodiment of any of the above, the gear mesh defines a gear mesh lateral stiffness. The flexible support lateral stiffness is less than 8% of the gear mesh lateral stiffness.

In a further embodiment of any of the above, there is a two stage high pressure turbine and a low pressure turbine with an inlet, an outlet, and a low pressure turbine pressure ratio greater than 5:1. The low pressure turbine pressure ratio is a ratio of a pressure measured prior to the inlet as related to a pressure at the outlet prior to any exhaust nozzle.

In a further embodiment of any of the above, the ring gear defines a ring gear lateral stiffness that is less than 12% of the gear mesh lateral stiffness.

In a further embodiment of any of the above, a low fan pressure ratio measured across the fan blades alone is less than 1.45.

In a further embodiment of any of the above, a bypass ratio is greater than ten (10).

In a further embodiment of any of the above, the gear system is an epicyclic gear system. The gear system includes a reduction ratio greater than 2.3.

In a further embodiment of any of the above, a low corrected fan tip speed is less than 1150 ft/second. The low corrected fan tip speed is an actual fan tip speed at an ambient temperature divided by $[(T_{ram}°R)/(518.7°R)]^{0.5}$. T represents the ambient temperature in degrees Rankine.

In a further embodiment of any of the above, a bypass ratio is greater than ten (10).

In a further embodiment of any of the above, the ring gear defines a ring gear lateral stiffness that is less than 12% of the gear mesh lateral stiffness.

In a further embodiment of any of the above, a low fan pressure ratio measured across the fan blades alone is less than 1.45.

In a further embodiment of any of the above, a low corrected fan tip speed is less than 1150 ft/second. The low corrected fan tip speed is an actual fan tip speed at an ambient temperature divided by $[(T_{ram}°R)/(518.7°R)]^{0.5}$. T represents the ambient temperature in degrees Rankine.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
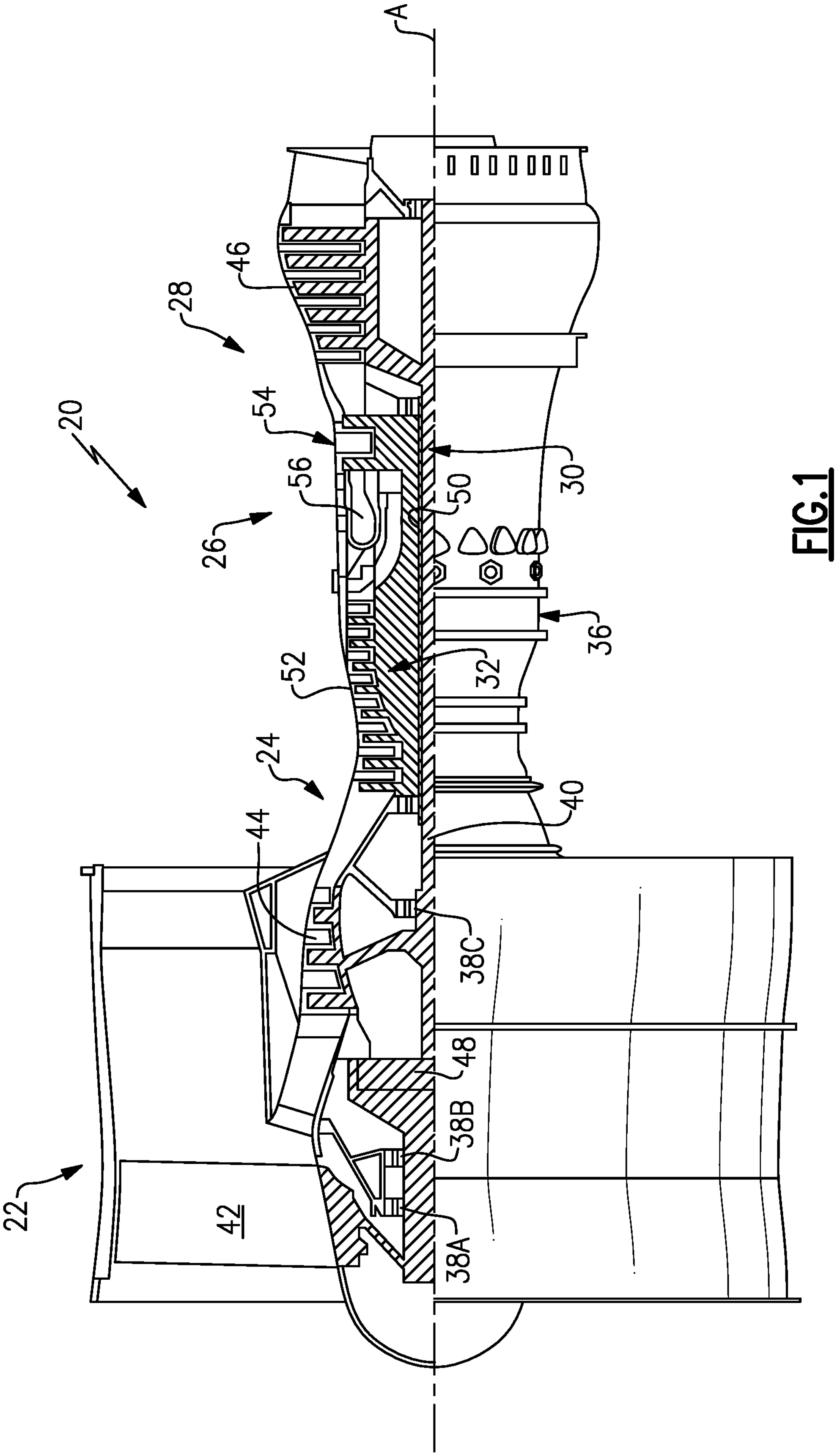
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram}°R)/(518.7°R)]^{0.5}$. The "Low corrected fan tip speed" as disclosed herein according to one non-limiting embodiment is less than about 1150 ft/second.

Figure 2:
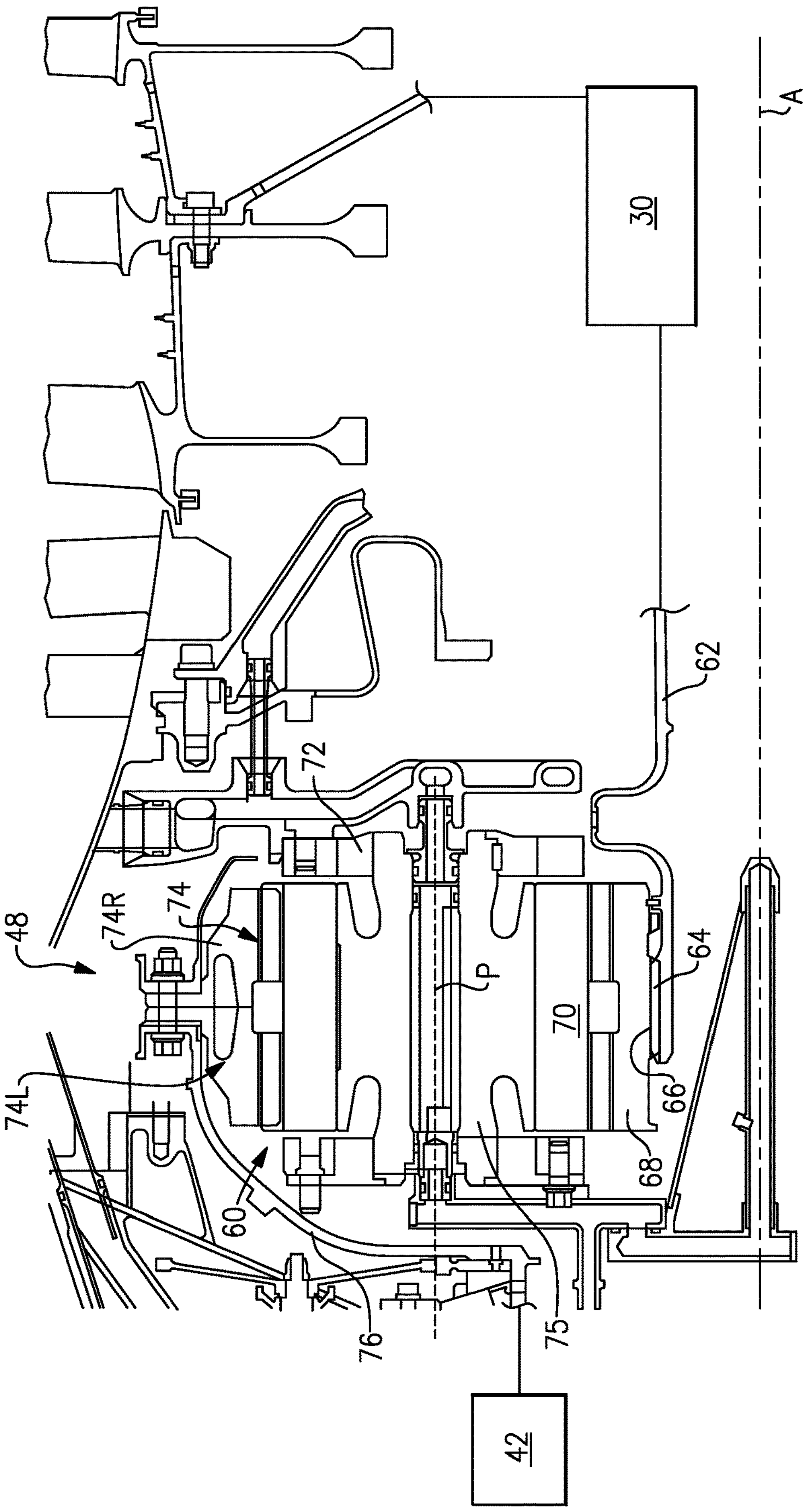
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input 62. The input 62, which may be in the form of a coupling, both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
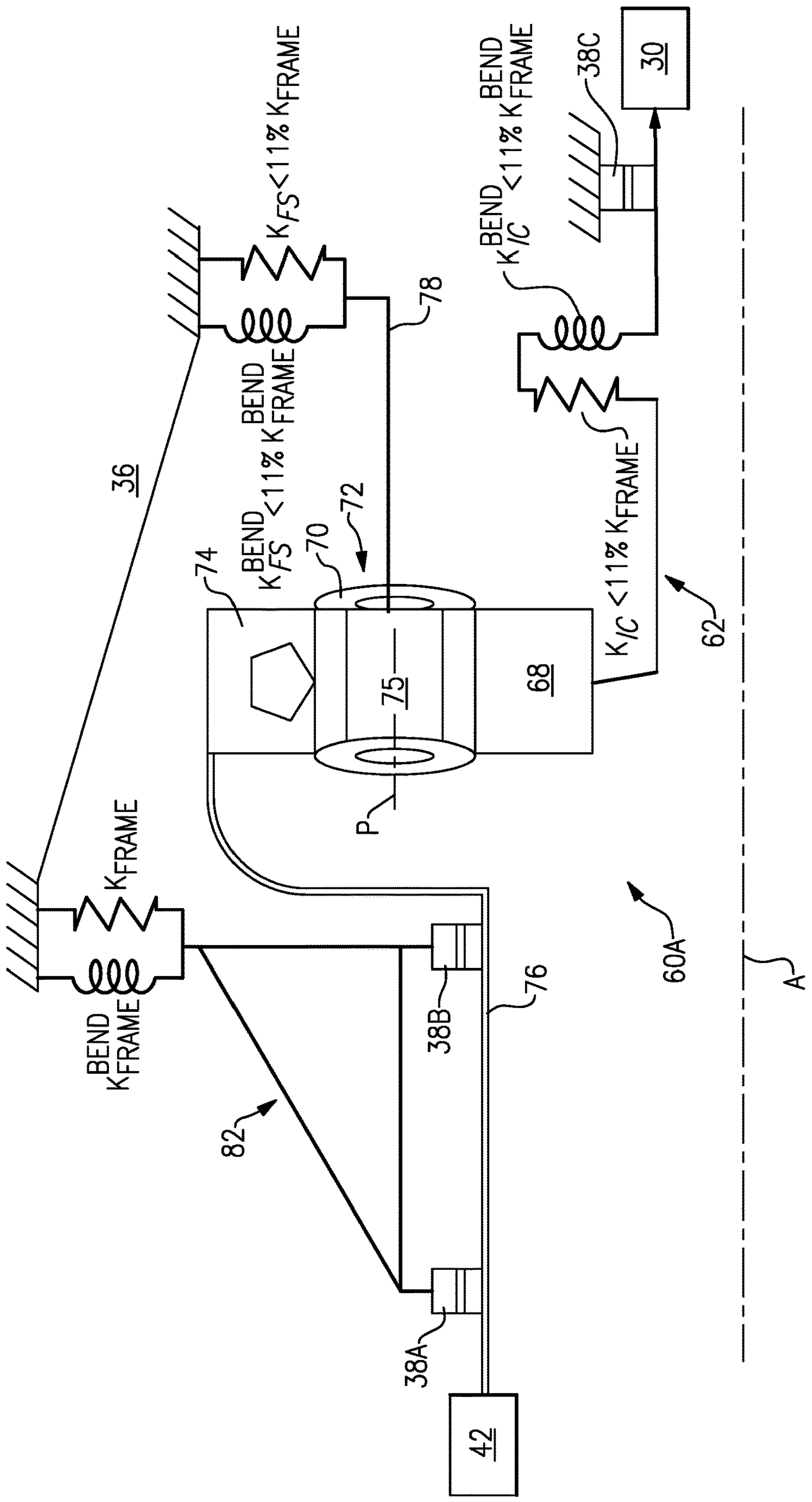
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It should be understood that lateral as defined herein is generally transverse to the axis of rotation A and the term "transverse" refers to a pivotal bending movement with respect to the axis of rotation A which typically absorbs deflection applied to the FDGS 60. The static structure 36 may further include a number 1 and 1.5 bearing support static structure 82 which is commonly referred to as a "K-frame" which supports the number 1 and number 1.5 bearing systems 38A, 38B. Notably, the K-frame bearing support defines a lateral stiffness (represented as Kframe in FIG. 3) and a transverse stiffness (represented as $Kframe^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness ($Kframe^{BEND}$). That is, the transverse stiffness of the entire FDGS 60 is controlled by this transverse stiffness relationship.

Figure 4:
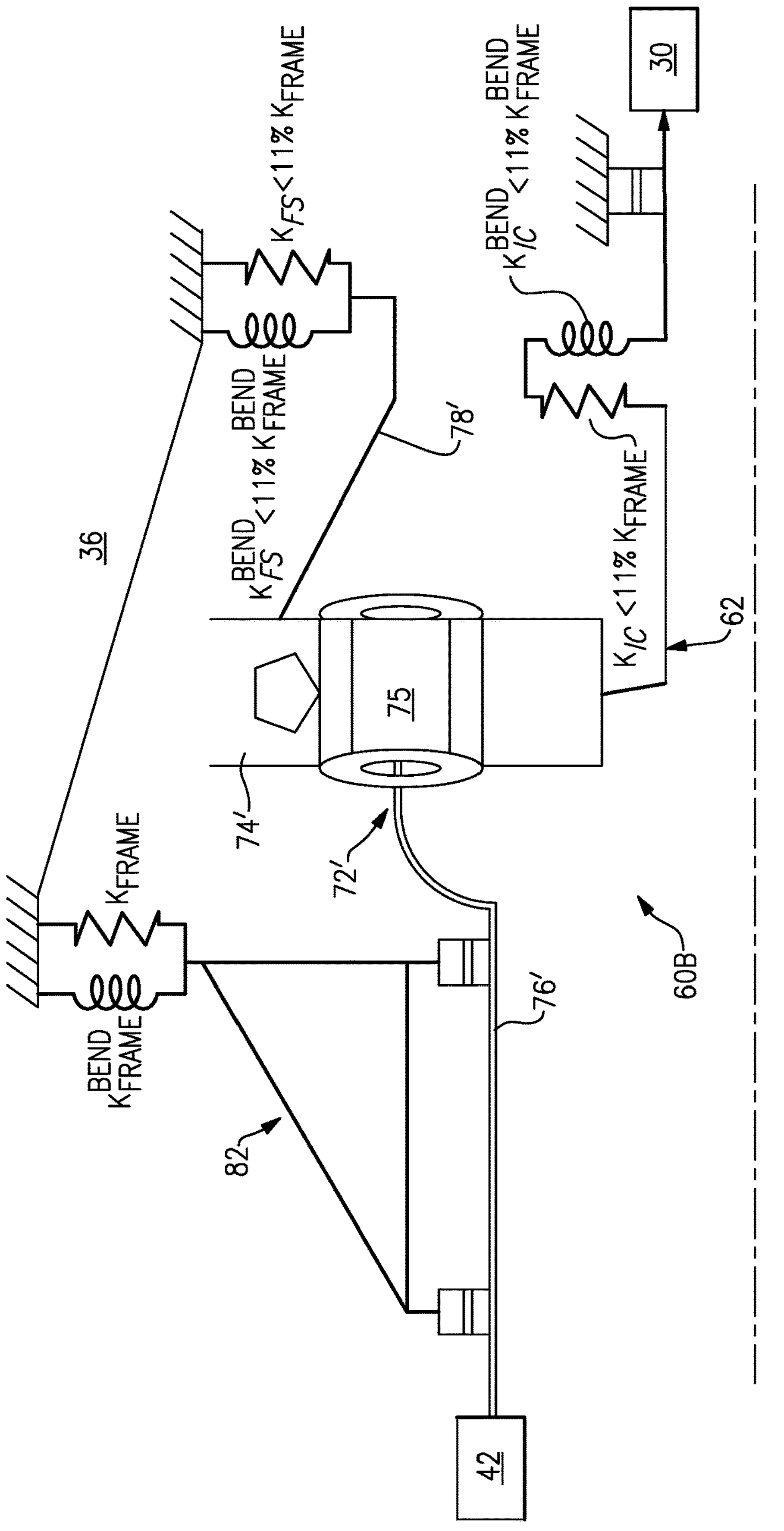
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
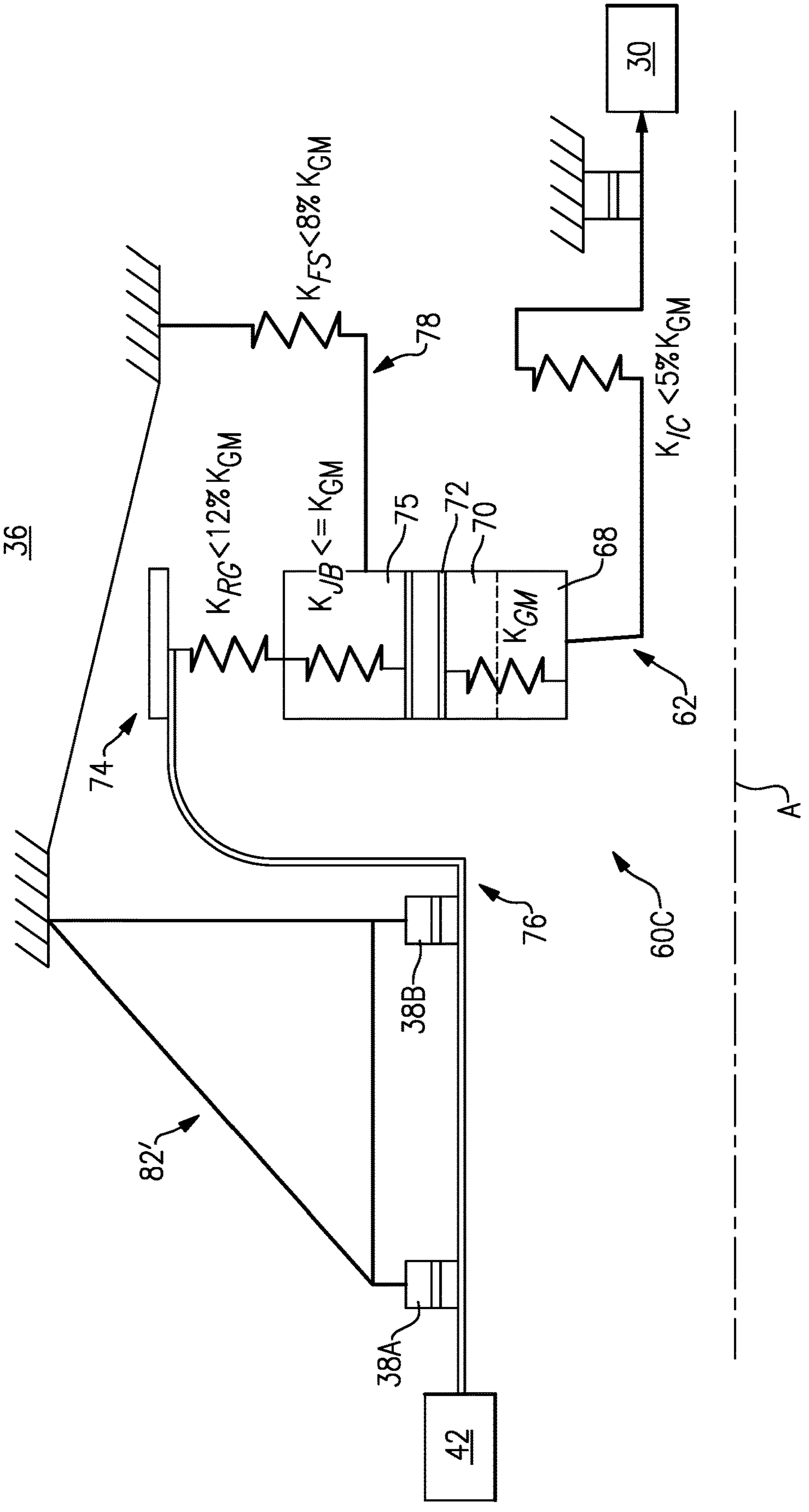
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
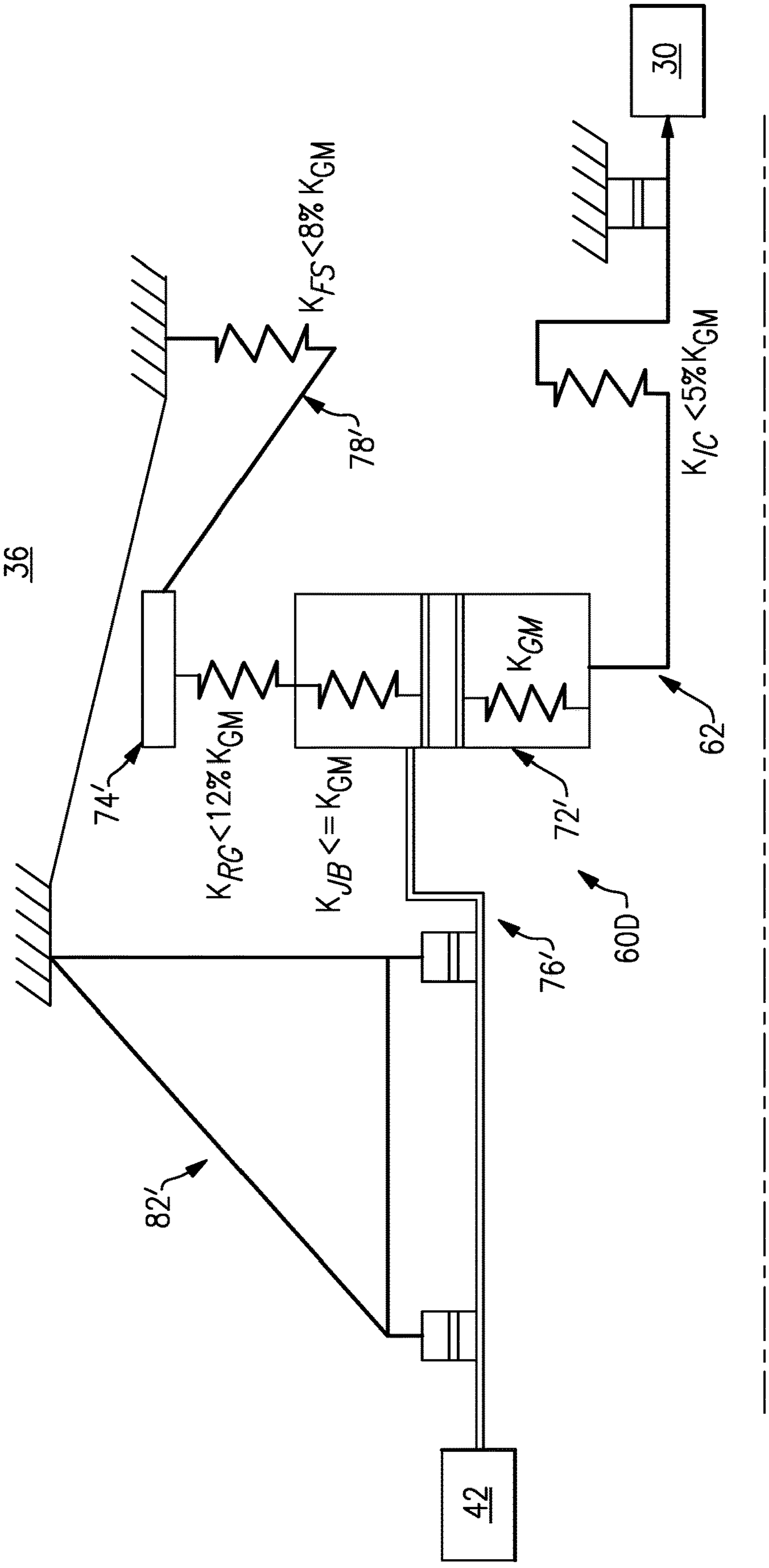
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
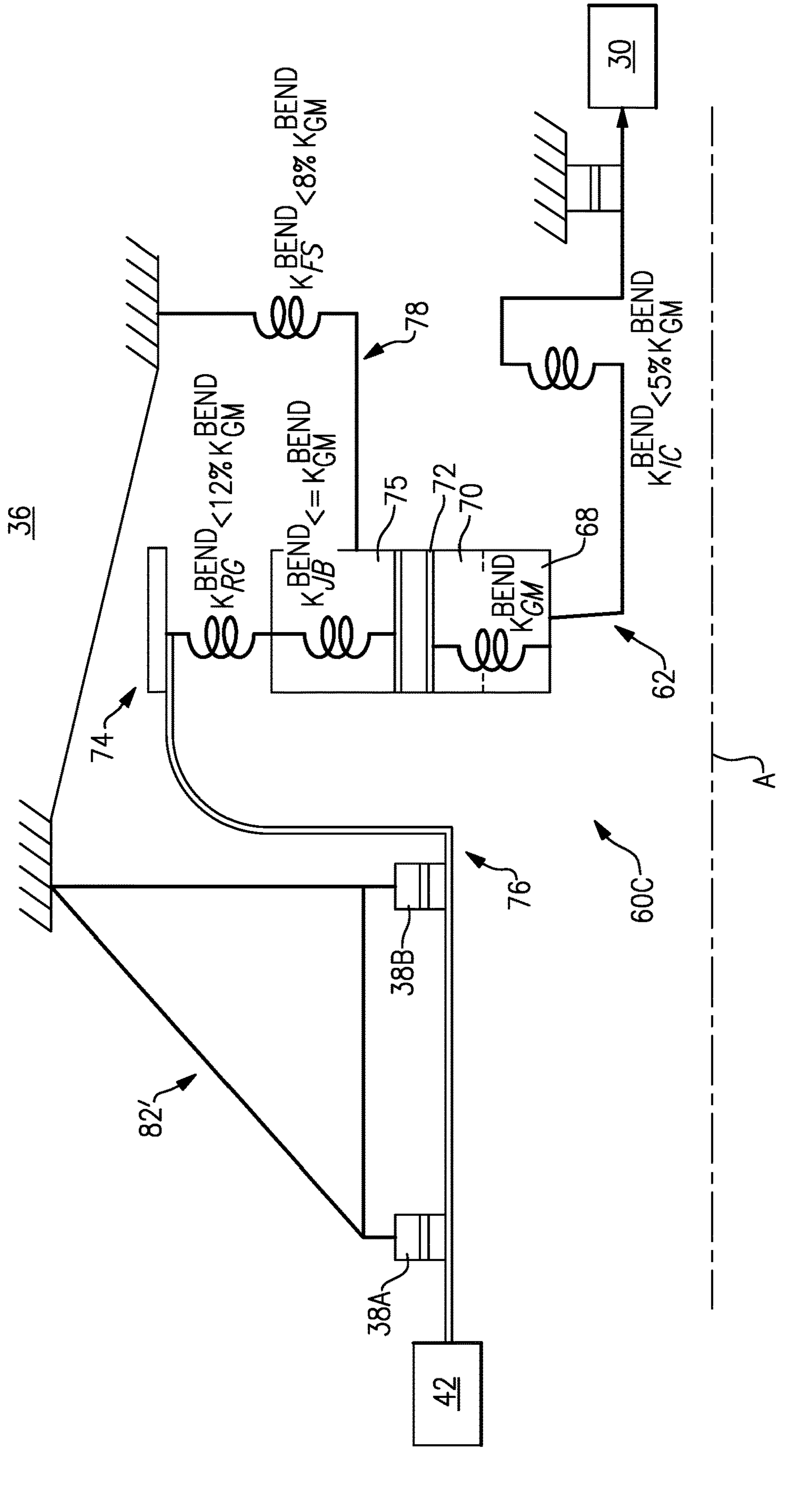
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness ($KIC^{BEND}$) of the input coupling 62, a transverse stiffness ($KFS^{BEND}$) of the flexible support 78, a transverse stiffness ($KRG^{BEND}$) of the ring gear 74 and a transverse stiffness ($KJB^{BEND}$) of the planet journal bearing 75 are controlled with respect to a transverse stiffness ($KGM^{BEND}$) of the gear mesh within the FDGS 60.

In the disclosed non-limiting embodiment, the stiffness ($KGM^{BEND}$) may be defined by the gear mesh between the sun gear 68 and the multiple planet gears 70. The transverse stiffness ($KGM^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness ($KJB^{BEND}$) may be mechanically defined by, for example, the stiffness within the planet journal bearing 75 and the transverse stiffness ($KRG^{BEND}$) of the ring gear 74 may be mechanically defined by, for example, the geometry of the ring gear wings 74L, 74R (FIG. 2).

In the disclosed non-limiting embodiment, the transverse stiffness ($KRG^{BEND}$) of the ring gear 74 is less than about 12% of the transverse stiffness ($KGM^{BEND}$) of the gear mesh; the transverse stiffness ($KFS^{BEND}$) of the flexible support 78 is less than about 8% of the transverse stiffness ($KGM^{BEND}$) of the gear mesh; the transverse stiffness ($KJB^{BEND}$) of the planet journal bearing 75 is less than or equal to the transverse stiffness ($KGM^{BEND}$) of the gear mesh; and the transverse stiffness ($KIC^{BEND}$) of an input coupling 62 is less than about 5% of the transverse stiffness ($KGM^{BEND}$) of the gear mesh.

Figure 8:
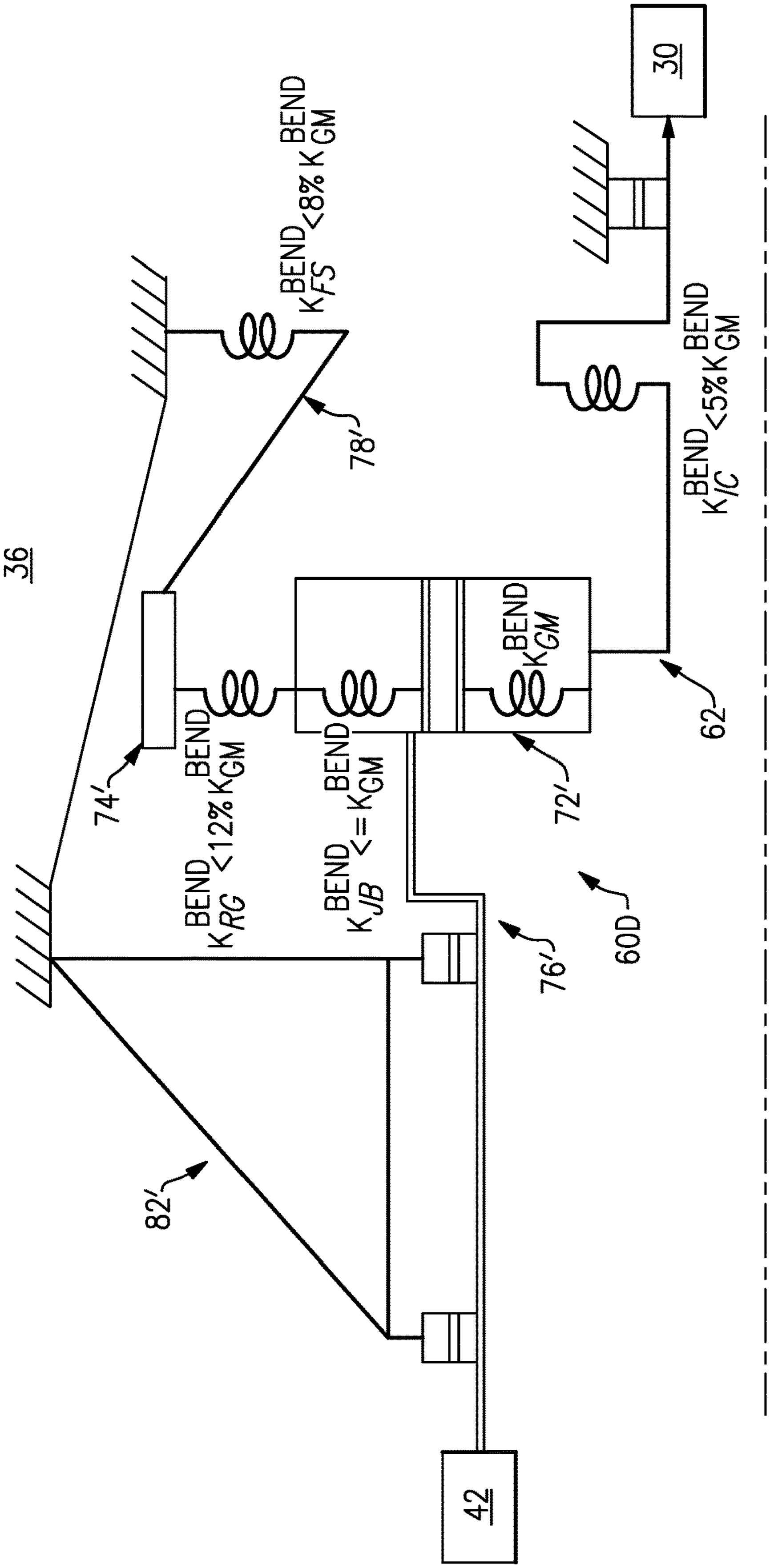
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

Figure 9:
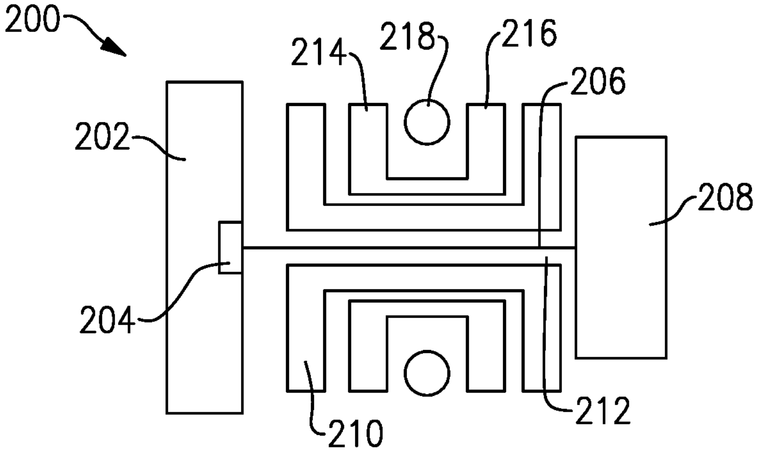
FIG. 9 shows another embodiment.

FIG. 9 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 10:
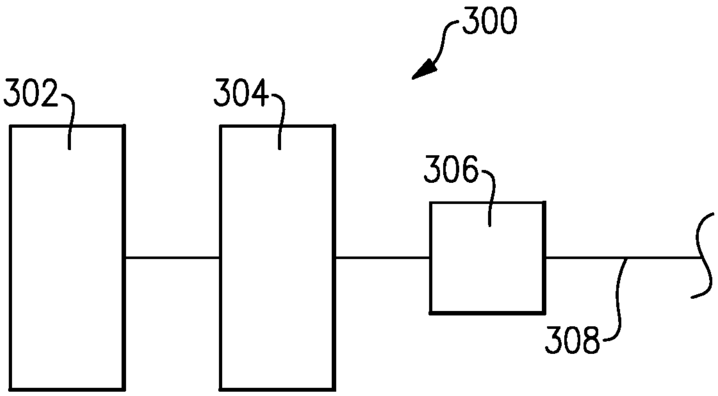
FIG. 10 shows yet another embodiment.

FIG. 10 shows yet another embodiment 300 wherein a fan rotor 302 and a first stage compressor 304 rotate at a common speed. The gear reduction 306 (which may be structured, mounted and operate as disclosed above) is intermediate the compressor rotor 304 and a shaft 308, which is driven by a low pressure turbine section.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A gas turbine engine, comprising:

a fan section having fan blades that drive air along a bypass flow path in a bypass duct;

a fan shaft drivingly connected to said fan section;

a turbine section including a turbine drive shaft;

a gear system connected to the turbine drive shaft on an input side of the gear system and connected to said fan shaft on an output side of the gear system, wherein there is at least one support supporting said gear system relative to a static structure; and a gear system flex mount arrangement, wherein said gear system flex mount arrangement accommodates misalignment of said fan shaft and said turbine drive shaft during operation and includes a gear mesh defining a gear mesh lateral stiffness and a ring gear defining a ring gear lateral stiffness that is less than 12% of said gear mesh lateral stiffness.

2. The gas turbine engine of claim 1, wherein said support is on an output side of the gear system and defines a gear system support lateral stiffness and a gear system support transverse stiffness.

3. The gas turbine engine of claim 2, further comprising an input coupling defining an input lateral stiffness and an input transverse stiffness and at least one of said input lateral stiffness or said input transverse stiffness are less than 11% of a respective one of said gear system support lateral stiffness and said gear system support transverse stiffness.

4. The gas turbine engine of claim 3, wherein said input lateral stiffness is less than 5% of said gear mesh lateral stiffness.

5. The gas turbine engine of claim 4, wherein said ring gear define a ring gear transverse stiffness and said gear mesh defines a gear mesh transverse stiffness and said ring gear transverse stiffness is less than 12% of said gear mesh transverse stiffness.

6. The gas turbine engine of claim 3, wherein said input lateral stiffness and said input transverse stiffness are less than 11% of a respective one of said gear system support lateral stiffness and said gear system support transverse stiffness.

7. The gas turbine engine of claim 3, wherein said bypass duct is at least partially defined by an outer housing.

8. The gas turbine engine of claim 7, wherein said gear system has a gear reduction ratio of greater than 2.3, and further comprising a bypass ratio greater than ten (10), a fan pressure ratio of less than 1.45 measured across said fan blades alone, and a low pressure turbine with an inlet, an outlet, and a low pressure turbine pressure ratio greater than 5:1, wherein said low pressure turbine pressure ratio is a ratio of a pressure measured prior to said inlet as related to a pressure at said outlet prior to any exhaust nozzle.

9. The gas turbine engine of claim 8, wherein said gear system flex mount arrangement further includes a flexible support which supports said gear system relative to the static structure and defines a flexible support transverse stiffness, and said flexible support transverse stiffness is less than 11% of said gear system support transverse stiffness.

10. The gas turbine engine of claim 9, further comprising a two stage high pressure turbine.

11. The gas turbine engine of claim 10, wherein said flexible support defines a flexible support lateral stiffness that is less than 11% of said gear system support lateral stiffness and said support is a K-frame.

12. The gas turbine engine of claim 2, wherein said gear system flex mount arrangement includes a flexible support which supports said gear system relative to the static structure and defines a flexible support lateral stiffness that is less than 11% of said gear system support lateral stiffness.

13. The gas turbine engine of claim 12, further comprising an input coupling connecting said gear system to said turbine drive shaft and defining an input transverse stiffness, said gear mesh defines a gear mesh transverse stiffness, and said input transverse stiffness is less than 11% of said gear system support transverse stiffness and less than 5% of said gear mesh transverse stiffness.

14. The gas turbine engine of claim 2, further comprising a flexible support which supports said gear system relative to the static structure and defines a flexible support lateral stiffness, wherein said flexible support lateral stiffness is less than 11% of said second gear system support lateral stiffness.

15. The gas turbine engine of claim 14, wherein said flexible support defines a flexible support transverse stiffness and said gear mesh defines a gear mesh transverse stiffness and said flexible support transverse stiffness is less than 8% of said gear mesh transverse stiffness.

16. The gas turbine engine of claim 15, wherein said flexible support transverse stiffness is less than 11% of said second gear system support transverse stiffness.

17. The gas turbine engine of claim 16, wherein said ring gear defines a ring gear transverse stiffness that is less than 20% of said gear mesh transverse stiffness.

18. The gas turbine engine of claim 17, further comprising an input coupling connecting said gear system to said turbine drive shaft and defining an input transverse stiffness that is less than 20% of said gear system support transverse stiffness.

19. The gas turbine engine of claim 18, wherein said bypass duct is at least partially defined by an outer housing.

20. The gas turbine engine of claim 19, wherein said input coupling defines an input lateral stiffness that is less than 11% of said gear system support lateral stiffness and said support is a K-frame.

21. The gas turbine engine of claim 20, further comprising a two stage high pressure turbine.

22. The gas turbine engine of claim 21, wherein said gear system has a gear reduction ratio of greater than 2.3, and further comprising a bypass ratio greater than ten (10), a fan pressure ratio of less than 1.45 measured across said fan blades alone, and a low pressure turbine with an inlet, an outlet, and a low pressure turbine pressure ratio greater than 5:1, wherein said low pressure turbine pressure ratio is a ratio of a pressure measured prior to said inlet as related to a pressure at said outlet prior to any exhaust nozzle.

23. The gas turbine engine of claim 1, wherein said bypass duct is at least partially defined by an outer housing and said gear system is an epicyclic gear system.

24. The gas turbine engine of claim 23, wherein said gear system has a gear reduction ratio of greater than 2.3, and further comprising a bypass ratio greater than ten (10), a fan pressure ratio of less than 1.45 measured across said fan blades alone, and a low pressure turbine with an inlet, an outlet, and a low pressure turbine pressure ratio greater than 5:1, wherein said low pressure turbine pressure ratio is a ratio of a pressure measured prior to said inlet as related to a pressure at said outlet prior to any exhaust nozzle.

25. The gas turbine engine of claim 1, further comprising a flexible support which supports said gear system relative to the static structure and defines a flexible support lateral stiffness that is less than 8% of said gear mesh lateral stiffness.

26. The gas turbine engine of claim 25, wherein said gear system has a gear reduction ratio of greater than 2.3, and further comprising a bypass ratio greater than ten (10), a fan pressure ratio of less than 1.45 measured across said fan blades alone, and a low pressure turbine with an inlet, an outlet, and a low pressure turbine pressure ratio greater than 5:1, wherein said low pressure turbine pressure ratio is a ratio of a pressure measured prior to said inlet as related to a pressure at said outlet prior to any exhaust nozzle.

27. The gas turbine engine of claim 26, wherein said gear mesh defines a gear mesh transverse stiffness and said flexible support defines a flexible support transverse stiffness that is less than 8% of said gear mesh transverse stiffness.

28. The gas turbine engine of claim 27, wherein said ring gear defines a ring gear transverse stiffness that is less than 12% of said gear mesh transverse stiffness.

29. The gas turbine engine of claim 28, wherein said gear system flex mount arrangement further includes a frame supporting said fan shaft and defining a frame lateral stiffness, wherein said flexible support lateral stiffness is less than 11% of said frame lateral stiffness.

30. The gas turbine engine of claim 29, further comprising a two stage high pressure turbine.

* * * * *